(12) United States Patent
Ohno et al.

(10) Patent No.: US 12,296,776 B2
(45) Date of Patent: May 13, 2025

(54) AIRBAG DEVICE AND PASSENGER PROTECTION DEVICE

(71) Applicant: TOYOTA JIDOSHA KABUSHIKI KAISHA, Toyota (JP)

(72) Inventors: Mitsuyoshi Ohno, Miyoshi (JP); Takeshi Yamamoto, Toki (JP); Toshiki Iwama, Toyota (JP); Yoshito Kusuhara, Ichinomiya (JP); Tsutomu Ishii, Ichinomiya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/374,012

(22) Filed: Sep. 28, 2023

(65) Prior Publication Data
US 2024/0123940 A1 Apr. 18, 2024

(30) Foreign Application Priority Data
Oct. 14, 2022 (JP) .................................. 2022-165753

(51) Int. Cl.
| | |
|---|---|
| *B60R 21/233* | (2006.01) |
| *B60R 21/207* | (2006.01) |
| *B60R 21/2338* | (2011.01) |
| *B60R 21/264* | (2006.01) |

(52) U.S. Cl.
CPC .......... *B60R 21/233* (2013.01); *B60R 21/207* (2013.01); *B60R 21/2338* (2013.01); *B60R 21/264* (2013.01); *B60R 2021/23386* (2013.01)

(58) Field of Classification Search
CPC ................ B60R 21/207; B60R 21/233; B60R 2021/2078; B60R 2021/23308; B60R 2021/23386; B60R 2021/23388
See application file for complete search history.

(56) References Cited

U.S. PATENT DOCUMENTS

| | | | | |
|---|---|---|---|---|
| 5,926,928 A | * | 7/1999 | Lundstedt | A44B 11/266 24/615 |
| 10,351,090 B2 | * | 7/2019 | Yamada | B60R 21/233 |
| 11,285,903 B2 | * | 3/2022 | Kokeguchi | B60R 21/207 |
| 11,285,904 B2 | * | 3/2022 | Jung | B60R 21/2338 |

(Continued)

FOREIGN PATENT DOCUMENTS

| | | | | |
|---|---|---|---|---|
| DE | 19834061 A1 | * | 2/2000 | ........... B60N 2/4876 |
| DE | 102022118796 A1 | * | 2/2024 | |

(Continued)

*Primary Examiner* — Paul N Dickson
*Assistant Examiner* — Tiffany L Webb
(74) *Attorney, Agent, or Firm* — Dinsmore & Shohl LLP

(57) ABSTRACT

An airbag device has an airbag. The airbag has a front-rear chamber and an airbag main body. The front-rear chamber has a left and right pair of front-rear extending portions that pass by respective left and right sides of a head of a passenger and inflate and deploy toward the seat front side, and a connecting portion connecting front end portions of the pair of front-rear extending portions in a seat left-right direction. The airbag main body inflates and deploys toward a side of the passenger at a seat rear side of the connecting portion, later than the front-rear chamber. The airbag main body has a downward-force applying portion that applies force directed toward a seat lower side to the airbag at a time when the passenger is restrained by the airbag.

18 Claims, 25 Drawing Sheets

(56) References Cited

U.S. PATENT DOCUMENTS

| | | | |
|---|---|---|---|
| 11,383,667 B1* | 7/2022 | Kadam | B60R 21/23138 |
| 11,427,150 B1* | 8/2022 | Jaradi | B60R 21/207 |
| 11,577,682 B1* | 2/2023 | Bates | B60R 21/214 |
| 11,772,592 B2* | 10/2023 | Min | B60R 21/207 |
| | | | 280/743.2 |
| 2006/0119083 A1* | 6/2006 | Peng | B60R 21/2338 |
| | | | 280/730.2 |
| 2007/0205591 A1* | 9/2007 | Bito | B60R 21/233 |
| | | | 280/743.2 |
| 2009/0189376 A1* | 7/2009 | Vigeant | B60R 21/233 |
| | | | 280/743.2 |
| 2015/0166002 A1* | 6/2015 | Fukawatase | B60R 21/233 |
| | | | 280/730.1 |
| 2016/0121839 A1* | 5/2016 | Ko | B60R 21/233 |
| | | | 280/730.1 |
| 2017/0015272 A1* | 1/2017 | Ohno | B60R 22/46 |
| 2017/0028955 A1* | 2/2017 | Ohno | B60R 21/233 |
| 2017/0057456 A1* | 3/2017 | Ohno | B60R 21/231 |
| 2017/0158155 A1* | 6/2017 | Ohno | B60R 21/237 |
| 2017/0282834 A1* | 10/2017 | Sugie | B60R 21/231 |
| 2017/0291565 A1* | 10/2017 | Yamamoto | B60R 21/2334 |
| 2017/0297524 A1* | 10/2017 | Sugie | B60R 21/233 |
| 2017/0334385 A1* | 11/2017 | Sakakibara | B60N 2/686 |
| 2017/0334386 A1* | 11/2017 | Park | B60R 21/2338 |
| 2018/0056922 A1* | 3/2018 | Yamada | B60R 21/205 |
| 2018/0126942 A1* | 5/2018 | Ohno | B60R 21/237 |
| 2018/0222432 A1* | 8/2018 | Schneider | B60R 21/262 |
| 2018/0236962 A1* | 8/2018 | Ohno | B60R 21/23138 |
| 2019/0016293 A1* | 1/2019 | Saso | B60R 21/23138 |
| 2019/0031132 A1* | 1/2019 | Dry | B60R 21/2338 |
| 2019/0054884 A1* | 2/2019 | Dry | B60R 21/2342 |
| 2019/0111879 A1* | 4/2019 | Ohmi | B60R 21/231 |
| 2019/0275979 A1* | 9/2019 | Dry | B60R 21/207 |
| 2019/0291678 A1* | 9/2019 | Cho | B60R 21/233 |
| 2019/0389420 A1* | 12/2019 | Dry | B60R 21/231 |
| 2020/0156586 A1* | 5/2020 | Lin | B60N 2/0028 |
| 2020/0290548 A1* | 9/2020 | Kokeguchi | B60R 21/233 |
| 2021/0061211 A1* | 3/2021 | Jung | B60R 21/2338 |
| 2021/0316695 A1* | 10/2021 | Matsushita | B60R 21/207 |
| 2021/0402949 A1* | 12/2021 | Sung | B60R 21/2338 |
| 2022/0017036 A1* | 1/2022 | Jeong | B60R 21/2338 |
| 2022/0111818 A1* | 4/2022 | Schneider | B60R 21/23138 |
| 2022/0203921 A1* | 6/2022 | Kawamura | B60R 21/2338 |
| 2022/0340096 A1* | 10/2022 | Axblom | B60R 21/2338 |
| 2022/0348161 A1* | 11/2022 | Faruque | B60R 21/233 |
| 2022/0388472 A1* | 12/2022 | Hwangbo | B60R 21/23138 |
| 2023/0065150 A1* | 3/2023 | Min | B60R 21/233 |
| 2023/0067856 A1* | 3/2023 | Min | B60R 21/233 |
| 2023/0294629 A1* | 9/2023 | Nakajima | B60R 21/231 |
| | | | 280/729 |
| 2023/0303028 A1* | 9/2023 | Ohno | B60R 21/2338 |
| 2023/0339421 A1* | 10/2023 | Yamamoto | B60R 21/207 |
| 2023/0406258 A1* | 12/2023 | Line | B60R 21/214 |
| 2024/0083381 A1* | 3/2024 | Ito | B60R 21/23138 |
| 2024/0123932 A1* | 4/2024 | Ohno | B60R 21/233 |
| 2024/0123933 A1* | 4/2024 | Ohno | B60R 21/264 |
| 2024/0123934 A1* | 4/2024 | Ohno | B60R 21/233 |
| 2024/0123935 A1* | 4/2024 | Ohno | B60R 21/207 |
| 2024/0123936 A1* | 4/2024 | Ohno | B60R 21/233 |
| 2024/0123937 A1* | 4/2024 | Ohno | B60R 21/207 |
| 2024/0123940 A1* | 4/2024 | Ohno | B60R 21/207 |

FOREIGN PATENT DOCUMENTS

| | | | |
|---|---|---|---|
| JP | 2018-083555 A | 5/2018 | |
| JP | 2019-018593 A | 2/2019 | |
| JP | 2019-218013 A | 12/2019 | |
| JP | 2019-218014 A | 12/2019 | |
| JP | 2024058409 A * | 4/2024 | B60R 21/207 |

* cited by examiner

AIRBAG DEVICE AND PASSENGER PROTECTION DEVICE

CROSS-REFERENCE TO RELATED APPLICATION

This application is based on and claims priority under 35 USC 119 from Japanese Patent Application No. 2022-165753 filed on Oct. 14, 2022, the disclosure of which is incorporated by reference herein.

BACKGROUND

Technical Field

The present disclosure relates to an airbag device, and to a passenger protection device equipped with the airbag device.

Related Art

The airbag device disclosed in Japanese Patent Application Laid-Open (JP-A) No. 2019-018593 has an inflator that generates high-pressure gas at the time of input of an impact, and a bag body (airbag) that receives a supply of gas from the inflator and inflates and deploys from the seatback of a vehicle seat. The airbag has a torso supporting portion that deploys at the side opposite the seatback so as to sandwich the torso of the passenger seated in the vehicle seat therebetween, and a pair of head supporting portions that are connected to the torso supporting portion and respectively deploy at the both sides in the transverse direction of the vehicle seat so as to sandwich the head of the passenger therebetween. A relief portion, which passes-through in the vertical direction between the pair of head supporting portions in the deployed state and into which the head of the passenger escapes, is formed at the airbag.

The airbag device disclosed in JP-A No. 2019-218013 has an inflator, and an airbag that deploys due to gas supplied from the inflator. The airbag has a rear inflating portion that deploys at the back surface side of a seat, a pair of side inflating portions that extend toward the front from the seat transverse direction both sides of the rear inflating portion, and a pair of front inflating portions that extend from the pair of side inflating portions toward the central side and are connected together at the center and cover the front of the passenger. In this airbag, a gas flow path is formed in the order of the rear inflating portion, the side inflating portions and the front inflating portions.

SUMMARY

In the airbag device disclosed in JP-A No. 2019-018593, the torso supporting portion (airbag main body) that deploys from the seat rear side toward the seat front side with respect to the passenger, is supported by the pair of head supporting portions (front-rear chambers) that respectively deploy at the respective left and right sides of the head of the passenger. Similarly, in the airbag device disclosed in JP-A No. 2019-218013, the pair of front inflating portions (airbag main body), which deploy from the seat rear side toward the seat front side with respect to the passenger, are supported by the pair of side inflating portions (front-rear chambers) that respectively deploy at the respective left and right sides of the head of the passenger.

In the above-described respective prior art, when the passenger is restrained by the airbag, there is the possibility that, due to input from the chest of the passenger being applied to the airbag main body, the airbag will escape toward the seat upper side around the proximal end portions of the front-rear chambers. Further, from an intermediate stage to the latter stage of the restraining of the passenger by the airbag, there is the possibility that, due to the airbag main body being nipped-in between the thighs and the upper body of the passenger who tilts forward due to the impact of the vehicle collision, the airbag main body will be pushed-out toward an obliquely front and upper side of the seat.

In view of the above-described circumstances, an object of the present disclosure is to provide an airbag device and a passenger protection device that, at the time of restraining a passenger, can suppress inadvertent displacement toward the seat upper side of an airbag that inflates and deploys from the seat rear side of the upper portion of a vehicle seat toward the seat front side.

An airbag device of a first aspect of the present disclosure includes an inflator configured to generate gas at a time of a collision of a vehicle, and an airbag to which the gas is supplied, and that is configured to inflate and deploy from a seat rear side of an upper portion of a vehicle seat toward a seat front side, wherein the airbag has a front-rear chamber having a left and right pair of front-rear extending portions that pass by respective left and right sides of a head of a passenger seated in the vehicle seat and inflate and deploy toward the seat front side, and a connecting portion connecting front end portions of the pair of front-rear extending portions in a seat left-right direction, an airbag main body configured to inflate and deploy toward a side of the passenger at a seat rear side of the connecting portion, later than the front-rear chamber, and a downward-force applying portion configured to apply force directed toward a seat lower side to the airbag at a time when the passenger is restrained by the airbag.

In the airbag device of the first aspect, at a time of a collision of the vehicle, gas generated from the inflator is supplied to the airbag, and the airbag inflates and deploys from the seat rear side of the upper portion of the vehicle seat toward the seat front side. The airbag has the front-rear chamber, the airbag main body and the downward force applying portion. The front-rear chamber has the left and right pair of front-rear extending portions that pass by respective left and right sides of the head of the passenger seated in the vehicle seat and inflate and deploy toward the seat front side, and the connecting portion connecting the front end portions of the pair of front-rear extending portions in the seat left-right direction. The airbag main body inflates and deploys toward a side of the passenger at the seat rear side of the connecting portion of the front-rear chamber, later than the front-rear chamber. The downward force applying portion applies force, which is directed toward the seat lower side, to the airbag at the time of passenger restraining by the airbag. Due thereto, the airbag being inadvertently displaced toward the seat upper side can be suppressed.

In an airbag device of a second aspect, in the first aspect, the airbag main body has a chest/abdomen restraining portion restraining a chest and an abdomen of the passenger further toward a seat lower side than the front-rear chamber, and a head restraining portion restraining the head of the passenger further toward a seat upper side than the front-rear chamber, before restraining of the chest and the abdomen by the chest/abdomen restraining portion, and the downward force applying portion is the head restraining portion.

In accordance with the airbag device of the second aspect, the airbag main body has the chest/abdomen restraining portion and the head restraining portion. The chest/abdomen restraining portion of the airbag main body restrains the chest and the abdomen of the passenger further toward the seat lower side than the front-rear chamber. The head restraining portion of the airbag main body restrains the head of the passenger further toward the seat upper side than the front-rear chamber, before the restraining of the chest and the abdomen by the chest/abdomen restraining portion. Due to the restraining of the head by the head restraining portion, a moment toward the seat lower side is applied around the proximal end portions of the pair of front-rear extending portions to the airbag main body. Due thereto, the airbag being inadvertently displaced toward the seat upper side can be suppressed.

In an airbag device of a third aspect, in the first aspect, the downward force applying portion is a ceiling abutting portion provided at an upper portion of the airbag main body, and abutting a ceiling of the vehicle at a time of restraining.

In accordance with the airbag device of the third aspect, at the time of passenger restraining by the airbag, the ceiling abutting portion that is provided at the upper portion of the airbag main body abuts the ceiling of the vehicle. Due thereto, reaction force, which is directed toward the seat lower side, is applied from the ceiling to the airbag main body, i.e., the airbag, and therefore, the airbag being inadvertently displaced toward the seat upper side can be suppressed.

In an airbag device of a fourth aspect, in the first aspect, the downward force applying portion is a left and right pair of rear tethers having respective one end portions that are attached to the pair of front-rear extending portions, and having respective other end portions are attached to a seatback of the vehicle seat or to a vehicle body further toward a seat rear side than the passenger, and that, at a time of restraining, pull the pair of front-rear extending portions in toward obliquely rearward and downward sides of the seat.

In accordance with the airbag device of the fourth aspect, respective one end portions of the left and right pair of rear tethers are attached to the pair of front-rear extending portions of the front-rear chamber, and respective other end portions thereof are attached to the seatback of the vehicle seat or to the vehicle body further toward the seat rear side than the passenger. At the time of passenger restraining by the airbag, the pair of rear tethers pull the pair of front-rear extending portions in toward obliquely rearward and downward sides of the seat. Due thereto, a component of force, which is directed toward the seat lower side, is applied to the airbag, and therefore, the airbag being inadvertently displaced toward the seat upper side can be suppressed.

In an airbag device of a fifth aspect, in the first aspect, the airbag main body is formed such that a dimension thereof in a seat left-right direction in an inflated and deployed state gradually decreases toward a lower end portion.

In accordance with the airbag device of the fifth aspect, the dimension, in the seat left-right direction, of the airbag main body that has inflated and deployed gradually decreases toward the lower end portion. Therefore, the left and right side surfaces are inclined so as to approach one another while heading toward the seat lower side. Due thereto, even in a case in which the arms of the passenger, which are flung-up toward seat obliquely frontward and upward sides due to the impact of a vehicle collision, interfere with the airbag main body, due to the arms slidingly contacting the side surfaces that are inclined as described above, the arms are pushed aside toward the outer sides in the seat left-right direction. As a result, the lifting force toward the seat upper side that is applied to the airbag main body from the arms of the passenger can be made to be small.

An airbag device of a sixth aspect includes an inflator configured to generate gas at a time of a collision of a vehicle, and an airbag to which the gas is supplied, and that is configured to inflate and deploy from a seat rear side of an upper portion of a vehicle seat toward a seat front side, wherein the airbag has a front-rear chamber having a left and right pair of front-rear extending portions that pass by respective left and right sides of a head of a passenger seated in the vehicle seat and inflate and deploy toward the seat front side, and a connecting portion connecting front end portions of the pair of front-rear extending portions in a seat left-right direction, and an airbag main body inflating and deploying toward a side of the passenger at a seat rear side of the connecting portion, later than the front-rear chamber, wherein the front-rear chamber is formed such that a dimension thereof in a seat left-right direction in an inflated and deployed state is smaller at a seat front side than at a seat rear side.

In the airbag device of the sixth aspect, at a time of a collision of the vehicle, gas generated from the inflator is supplied to the airbag, and the airbag inflates and deploys from the seat rear side of the upper portion of the vehicle seat toward the seat front side. The airbag has the front-rear chamber and the airbag main body. The front-rear chamber has the left and right pair of front-rear extending portions that pass by respective left and right sides of the head of the passenger seated in the vehicle seat and inflate and deploy toward the seat front side, and the connecting portion connecting the front end portions of the pair of front-rear extending portions in the seat left-right direction. The airbag main body inflates and deploys toward a side of the passenger at the seat rear side of the connecting portion of the front-rear chamber, later than the front-rear chamber. This front-rear chamber is formed such that the dimension thereof in the seat left-right direction in the inflated and deployed state is smaller at the seat front side than at the seat rear side. Due thereto, it is difficult for the arms of the passenger, which are flung-up toward seat obliquely frontward and upward sides due to the impact of a vehicle collision, to interfere with the front-rear chamber. Therefore, the airbag being lifted-up toward the seat upper side by the above-described interference can be prevented or suppressed.

In an airbag device of a seventh aspect, in the sixth aspect, the airbag main body is formed such that a dimension thereof in a seat left-right direction in an inflated and deployed state is smaller at a seat front side than at a seat rear side, and front portions of the pair of front-rear extending portions are sewn respectively to left and right side surfaces of the airbag main body that is in an inflated and deployed state.

In accordance with the airbag device of the seventh aspect, the airbag main body is formed such that the dimension thereof in the seat left-right direction in the inflated and deployed state is smaller at the seat front side than at the seat rear side. The front portions of the pair of front-rear extending portions are sewn to left and right side surfaces of the airbag main body that is in an inflated and deployed state, respectively. Due thereto, the shape of the front-rear chamber, whose dimension in the seat left-right direction in the inflated and deployed state is smaller at the seat front side than at the seat rear side, can be formed easily.

An airbag device of an eighth aspect includes an inflator configured to generate gas at a time of a collision of a vehicle, and an airbag to which the gas is supplied, and that inflate and deploy from a seat rear side of an upper portion of a vehicle seat toward a seat front side, wherein the airbag has a front-rear chamber having a left and right pair of front-rear extending portions that pass by respective left and right sides of a head of a passenger seated in the vehicle seat and inflate and deploy toward the seat front side, and a connecting portion connecting front end portions of the pair of front-rear extending portions in a seat left-right direction, and an airbag main body inflating and deploying toward a side of the passenger at a seat rear side of the connecting portion, later than the front-rear chamber, and wherein a front side portion, which includes the airbag main body, of the airbag before inflation and deployment is rolled-up from both outer sides in the seat left-right direction toward a central side in the seat left-right direction.

In the airbag device of the eighth aspect, at a time of a collision of the vehicle, gas generated from the inflator is supplied to the airbag, and the airbag inflates and deploys from the seat rear side of the upper portion of the vehicle seat toward the seat front side. The airbag has the front-rear chamber and the airbag main body. The front-rear chamber has the left and right pair of front-rear extending portions that pass by respective left and right sides of the head of the passenger seated in the vehicle seat and inflate and deploy toward the seat front side, and the connecting portion connecting the front end portions of the pair of front-rear extending portions in the seat left-right direction. The airbag main body inflates and deploys toward a side of the passenger at the seat rear side of the connecting portion of the front-rear chamber, later than the front-rear chamber. At the airbag before inflation and deployment, the front side (distal end side) portion that includes the airbag main body is rolled-up from both outer sides in the seat left-right direction toward the central side in the seat left-right direction. This front side portion that includes the airbag main body deploys toward the seat front side of the passenger due to the inflation and deployment of the front-rear chamber, and thereafter, inflates and deploys from the seat left-right direction central side toward the seat left-right direction both outer sides. Due to this inflation and deployment of the front side portion that includes the airbag main body, the arms of the passenger can be pushed aside toward the outer sides in the seat left-right direction. As a result, it is difficult for the arms of the passenger, which are flung-up toward seat obliquely forward and upward sides due to the impact of a vehicle collision, to interfere with the airbag. Therefore, the airbag being lifted-up toward the seat upper side by this interference can be prevented or suppressed.

A passenger protection device of a ninth aspect includes a vehicle seat in which a passenger sits, and the airbag device of the first aspect, the sixth aspect or the eighth aspect, which is installed at a seat rear side of an upper portion of the vehicle seat.

In the passenger protection device of the ninth aspect, the airbag device is installed at the seat rear side of the upper portion of a vehicle seat in which a passenger sits. This airbag device is the airbag device of the first aspect, the sixth aspect or the eighth aspect. Therefore, effects that are similar to the first aspect, the sixth aspect or the eighth aspect are obtained.

As described above, in the airbag device and passenger protection device relating to the present disclosure, it is possible to, at the time of restraining a passenger, suppress inadvertent displacement toward the seat upper side of an airbag that inflates and deploys from the seat rear side of the upper portion of a vehicle seat toward the seat front side.

BRIEF DESCRIPTION OF THE DRAWINGS

Exemplary embodiments of the present disclosure will be described in detail based on the following figures, wherein.

DETAILED DESCRIPTION

First Embodiment

Figure 1:
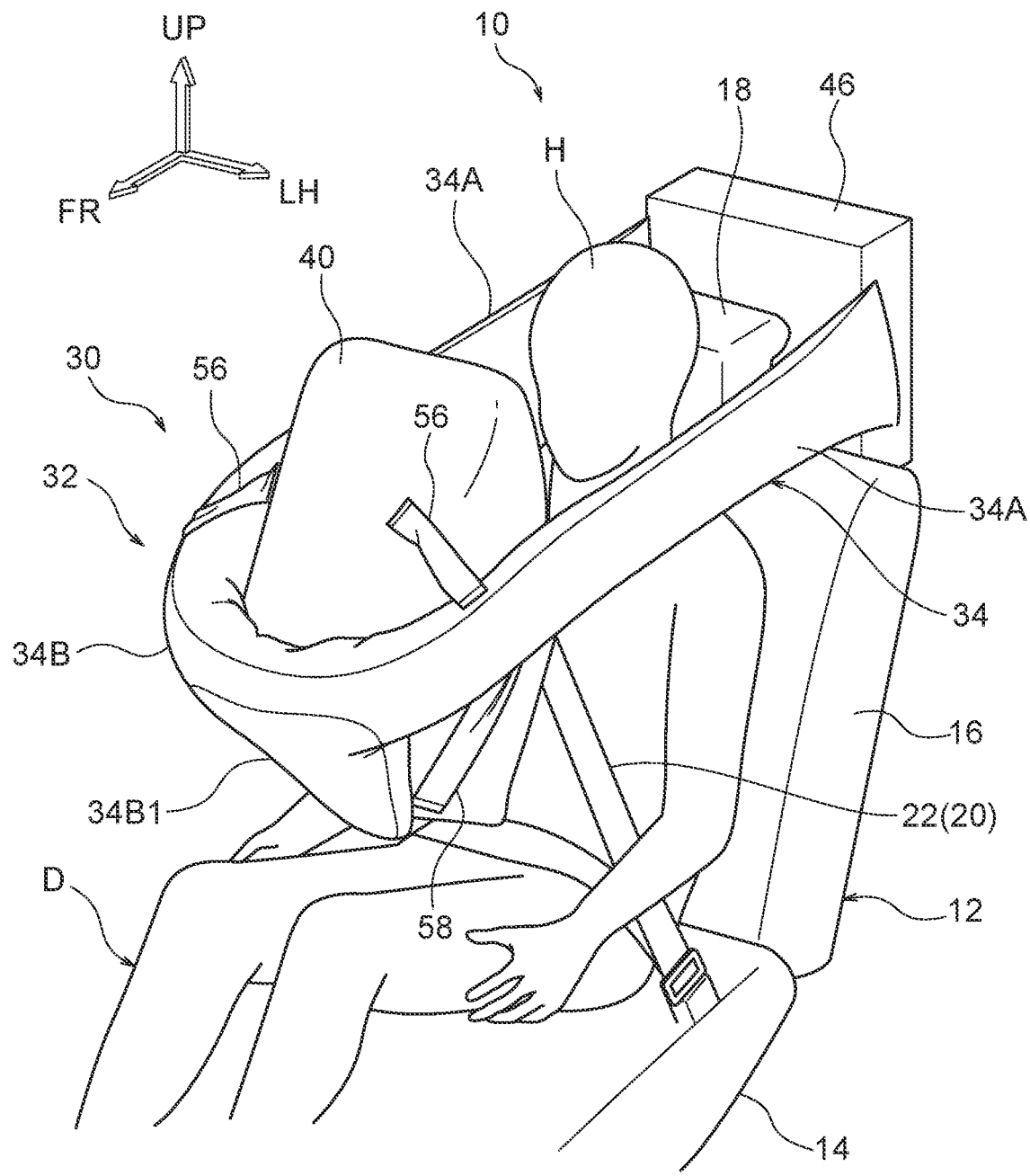
FIG. 1 is a perspective view illustrating a state in which an airbag has inflated and deployed, at a passenger protection device relating to a first embodiment.
Figure 2:
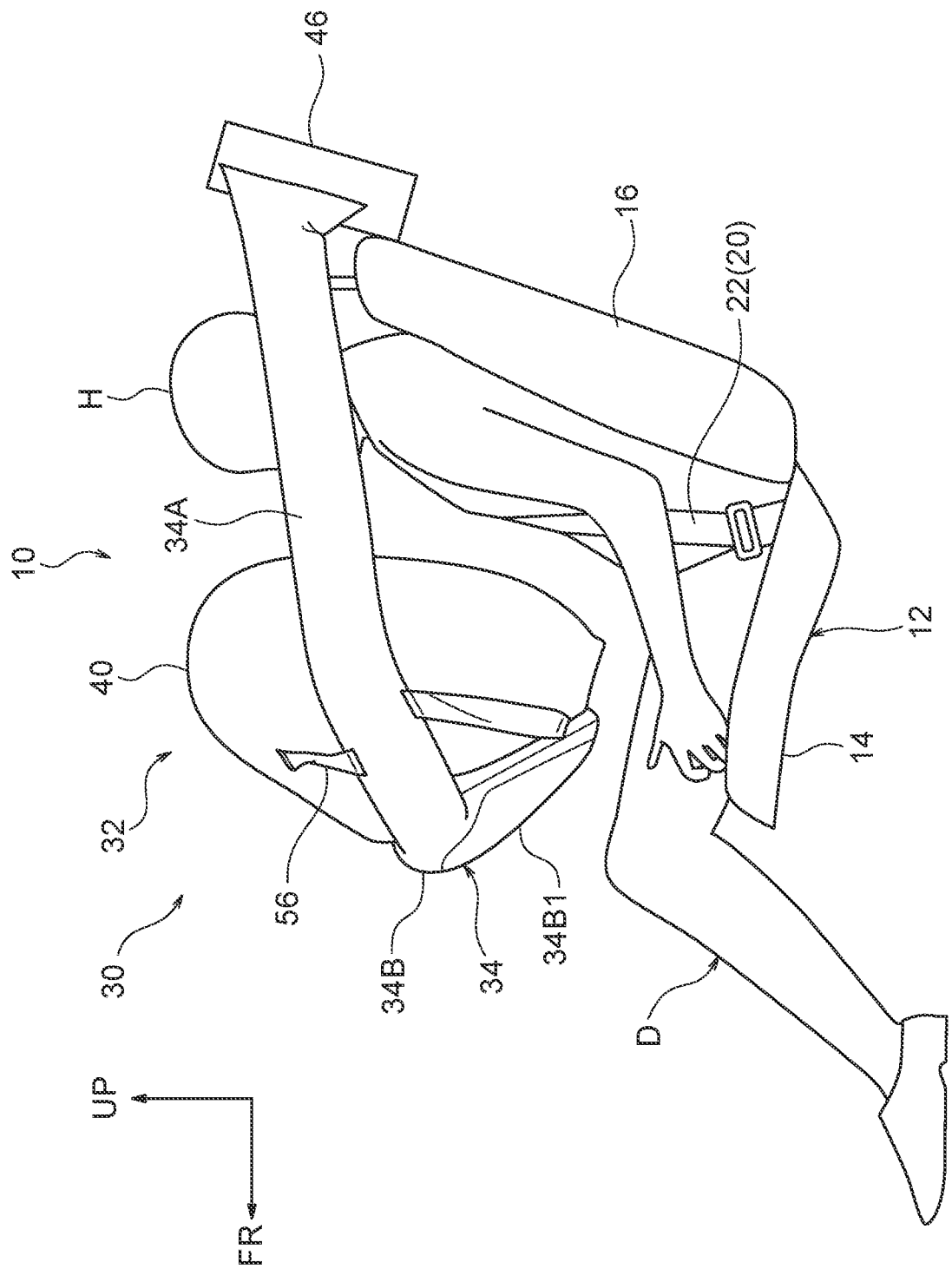
FIG. 2 is a side view illustrating the structures shown in FIG. 1 in a state of being viewed from a vehicle left side.

A passenger protection device 10 relating to a first embodiment of the present disclosure is described hereinafter with reference to FIG. 1 through FIG. 9. Note that, in the respective drawings, there are cases in which some of the reference numerals are omitted in order to make the drawings easy to understand. Further, arrow FR, arrow UP, arrow LH and arrow RH that are shown appropriately in the respective drawings indicate the forward direction (advancing direction), upward direction, leftward direction and rightward direction of a vehicle, respectively. When description is given hereinafter by using merely front-rear, left-right, and vertical directions, they refer to the front-rear of the vehicle front-rear direction, the left-right of the vehicle left-right direction, and the vertical of the vehicle vertical direction, unless otherwise specified.

As illustrated in FIG. 1 through FIG. 5, the passenger protection device 10 is structured by a vehicle seat 12 and an airbag device 30. The vehicle seat 12 here is a rear seat of a vehicle (automobile), but may be a front seat. The vehicle seat 12 has a seat cushion 14, a seatback 16 provided so as to stand at the upper side of the rear end portion of the seat cushion 14, and a headrest 18 connected to the upper end portion of the seatback 16. The front-rear, left-right, and vertical directions of the vehicle seat 12 coincide with the front-rear, left-right, and vertical directions of the vehicle.

Note that FIG. 1 through FIG. 5 illustrate a state in which a crash test dummy D, which serves as a model of a passenger (a seated person) who is to be protected, is seated on the seat cushion 14 of the vehicle seat 12. The dummy D is, for example, an AM50 (50th percentile U.S. adult male) dummy for a front collision test (Hybrid III). The dummy D is seated in the standard seated posture prescribed by the crash test method, and the vehicle seat 12 is positioned at the standard set position corresponding to that seated posture. Hereinafter, the dummy D will be called □passenger D□ in order to facilitate understanding.

The passenger D seated on the seat cushion 14 of the vehicle seat 12 is restrained in the vehicle seat 12 by a seatbelt 22 (refer to FIG. 1 through FIG. 3; not illustrated in FIG. 4 and FIG. 5) of a seatbelt device 20. The seatbelt device 20 is a three-point seatbelt device, and is a so-called seat-mounted seatbelt device in which an unillustrated retractor, anchor and buckle are provided at the vehicle seat 12.

The airbag device 30 has an airbag 32, a pair of inflators 44 (refer to FIG. 6), and a module case 46 (not illustrated in FIG. 8 through FIG. 11). At usual times, the airbag 32 is stored in a folded-up state within the module case 46 together with the pair of inflators 44. The module case 46 is formed in the shape of a rectangular parallelopiped that is hollow. The module case 46 is disposed at the rear of the upper portion of the vehicle seat 12 (specifically, at the rear of the upper end portion of the seatback 16 and the headrest 18), and is fixed to the upper end portion of the seatback 16 or to an unillustrated vehicle body.

The airbag 32 receives the supply of gas from the pair of inflators 44, and inflates and deploys from the rear side of the upper portion of the vehicle seat 12 toward the front side. This airbag 32 has a front-rear chamber 34 and an airbag main body 40. The front-rear chamber 34 has a left and right pair of front-rear extending portions 34A that inflate and deploy past the respective left and right sides of head H of the passenger D toward the front side, and a connecting portion 34B that connects the front end portions of the pair of front-rear extending portions 34A in the left-right direction. The airbag main body 40 inflates and deploys at the rear side of the connecting portion 34B toward the passenger D side (the rear side), later than the front-rear chamber 34.

Figure 6:
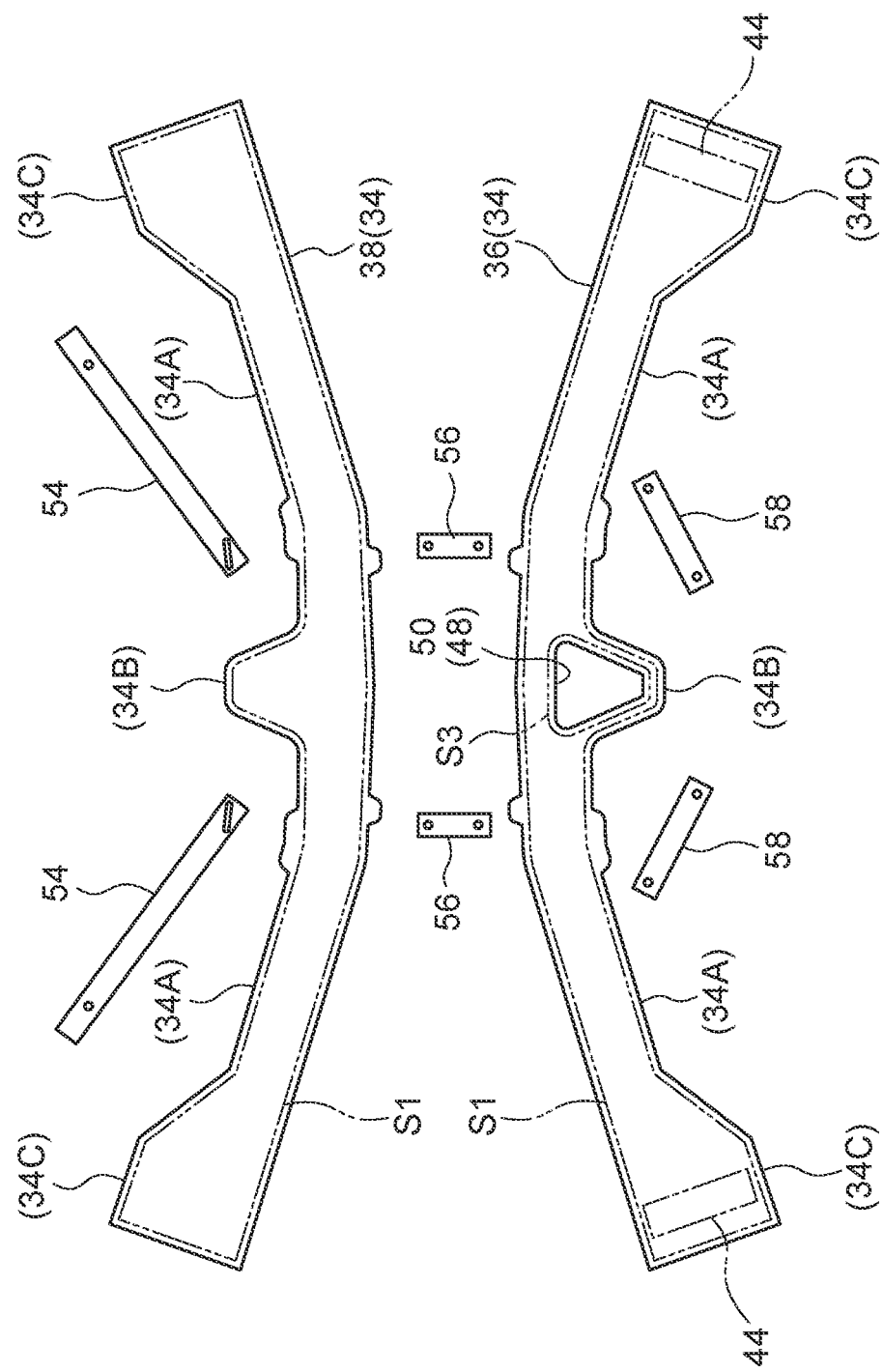
FIG. 6 is an deployed view of a front-rear chamber of the airbag.
Figure 7:
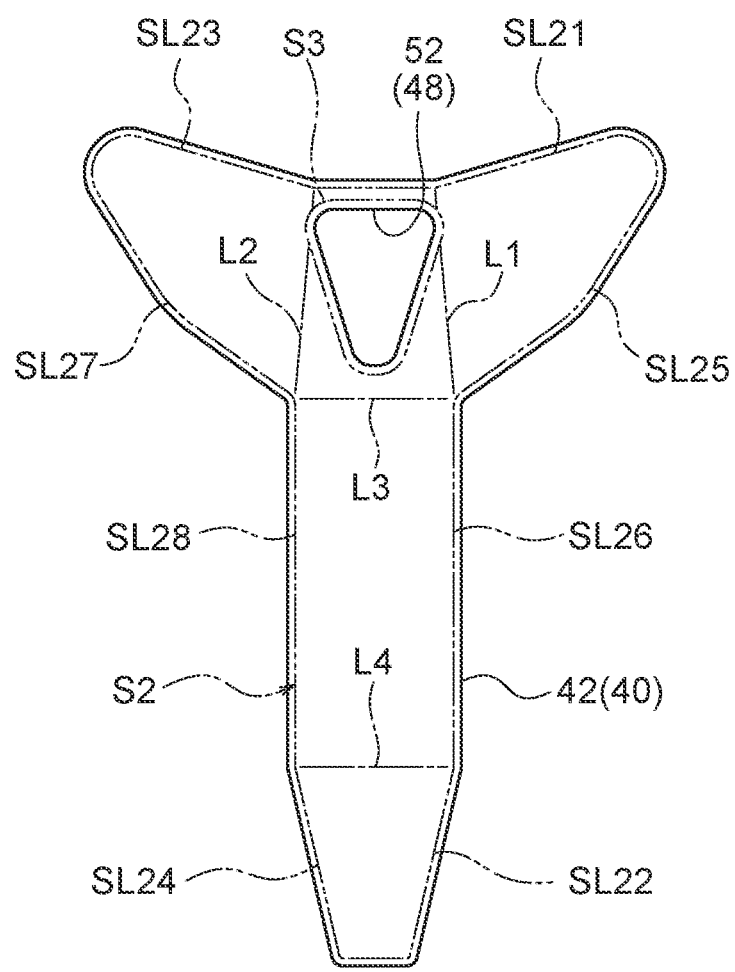
FIG. 7 is an deployed view of an airbag main body of the airbag.

The front-rear chamber 34 is formed in the shape of an elongated bag due to two elongated base fabrics 36, 38 that are illustrated in FIG. 6 being superposed and the peripheral edge portions thereof being sewn together at sewn portion S1. The airbag main body 40 is formed in the shape of a bag due to a single base fabric 42 illustrated in FIG. 7 being folded-over along four fold lines L1, L2, L3, L4, and being sewn together at sewn portion S2. At this sewn portion S2, sewing line SL21 and sewing line SL22 are sewn together, sewing line SL23 and sewing line SL24 are sewn together, sewing line SL25 and sewing line SL26 are sewn together, and sewing line SL27 and sewing line SL28 are sewn together. The above-described base fabrics 36, 38, 42 are formed of fabric materials of nylon or polyester for example.

The length direction both end portions of the front-rear chamber 34 are a left and right pair of inflator accommodating portions 34C that accommodate the pair of inflators 44. The length direction central portion of the front-rear chamber 34 is the connecting portion 34B. The portions between the connecting portion 34B and the pair of inflator accommodating portions 34C are the front-rear extending portions 34A respectively. The pair of inflators 44 are combustion or cold gas cylindrical inflators, and generate gas by being operated. Operation of the inflators 44 is controlled by an unillustrated control device, and the inflators 44 are made to generate gas at the time of a collision of the vehicle.

The pair of inflator accommodating portions 34C are disposed within the module case 46 so as to be dispersed at the respective left and right sides. The inflators 44 accommodated within the inflator accommodating portions 34C are disposed in postures in which the axial directions thereof run along the vertical direction of the seatback 16. For example, a pair of upper and lower stud bolts are provided at each inflator 44. The pairs of stud bolts pass-through the inflator accommodating portions 34C, the module case 46, and an unillustrated frame of the seatback 16, and nuts are screwed-together with these stud bolts. Due thereto, the inflator accommodating portions 34C, the inflators 44 and the module case 46 are fixed to the frame of the seatback 16.

The pair of front-rear extending portions 34A are respectively formed in elongated tube shapes. The connecting portion 34B is formed in the shape of a substantially T-shaped bag that communicates with the respective front-rear extending portions 34A. The connecting portion 34B is sewn to the airbag main body 40 at sewn portion S3 (refer to FIG. 6 and FIG. 8) that is provided at the central portion of the connecting portion 34B. As an example, the sewn portion S3 is formed in a substantially upside-down trapezoidal shape. A communication hole 48, which communicates the interior of the connecting portion 34B and the interior of the airbag main body 40, is formed at the inner side of the sewn portion S3. As an example, the communication hole 48 is formed in a substantially upside-down trapezoidal shape. The communication hole 48 is structured by a through-hole 50 formed in the base fabric 36 of the front-rear chamber 34, and a through-hole 52 formed in the base fabric 42 of the airbag main body 40.

At usual times, the pair of front-rear extending portions 34A, the connecting portion 34B and the airbag main body 40 are folded-up by a predetermined way of folding such as rolling-up or corrugating or the like, and are accommodated within the module case 46. When the pair of inflators 44 operate, gas is generated at the interiors of the pair of inflator accommodating portions 34C. The gas generated within the pair of inflator accommodating portions 34C passes-through the pair of front-rear extending portions 34A, and flows to the connecting portion 34B side, and passes-through the communication hole 48 and is supplied to the interior of the airbag main body 40. Due thereto, the airbag 32 inflates and deploys in the order of the pair of front-rear extending portions 34A, the connecting portion 34B and the airbag main body 40. At the time of inflation and deployment of the airbag 32, unillustrated tear lines formed in the module case 46 receive the inflation pressure of the airbag 32 and rupture. Due thereto, the airbag 32 can inflate and deploy toward the outer side of the module case 46.

The airbag main body 40 that has inflated and deployed restrains, from the front side, the passenger D who inertially moves forward due to the impact of a vehicle collision. At this time of restraining the passenger, the front-rear chamber 34 is stretched in the front-rear direction, and the airbag main body 40 is compressed in the front-rear direction. The shape of the airbag main body 40 is set such that the airbag main body 40 is sandwiched between thighs F and chest C of the passenger D, from an intermediate stage to the latter stage of the time of passenger restraining.

Figure 3:
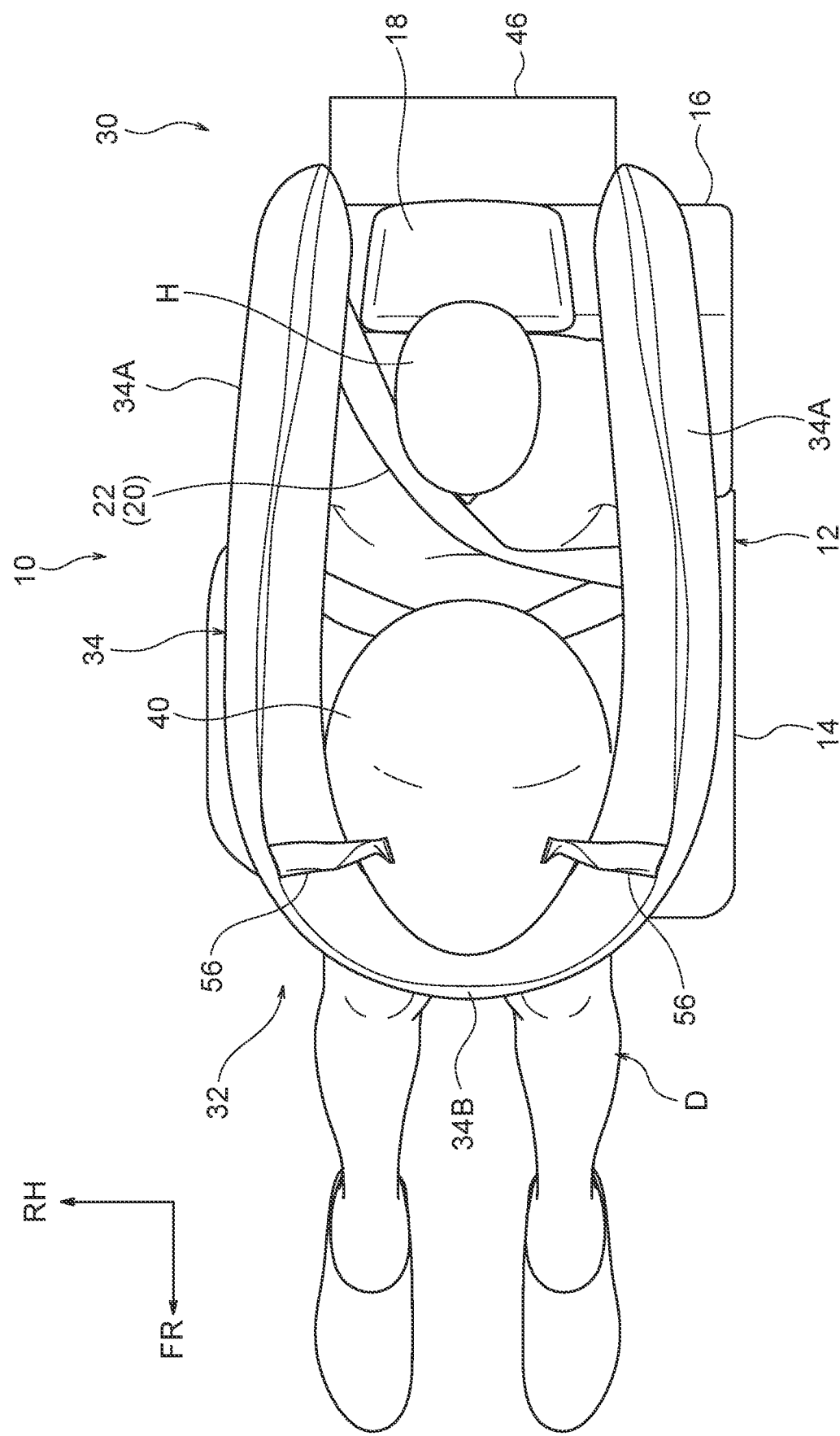
FIG. 3 is a plan view illustrating the structures shown in FIG. 1 in a state of being viewed from a vehicle upper side.
Figure 4:
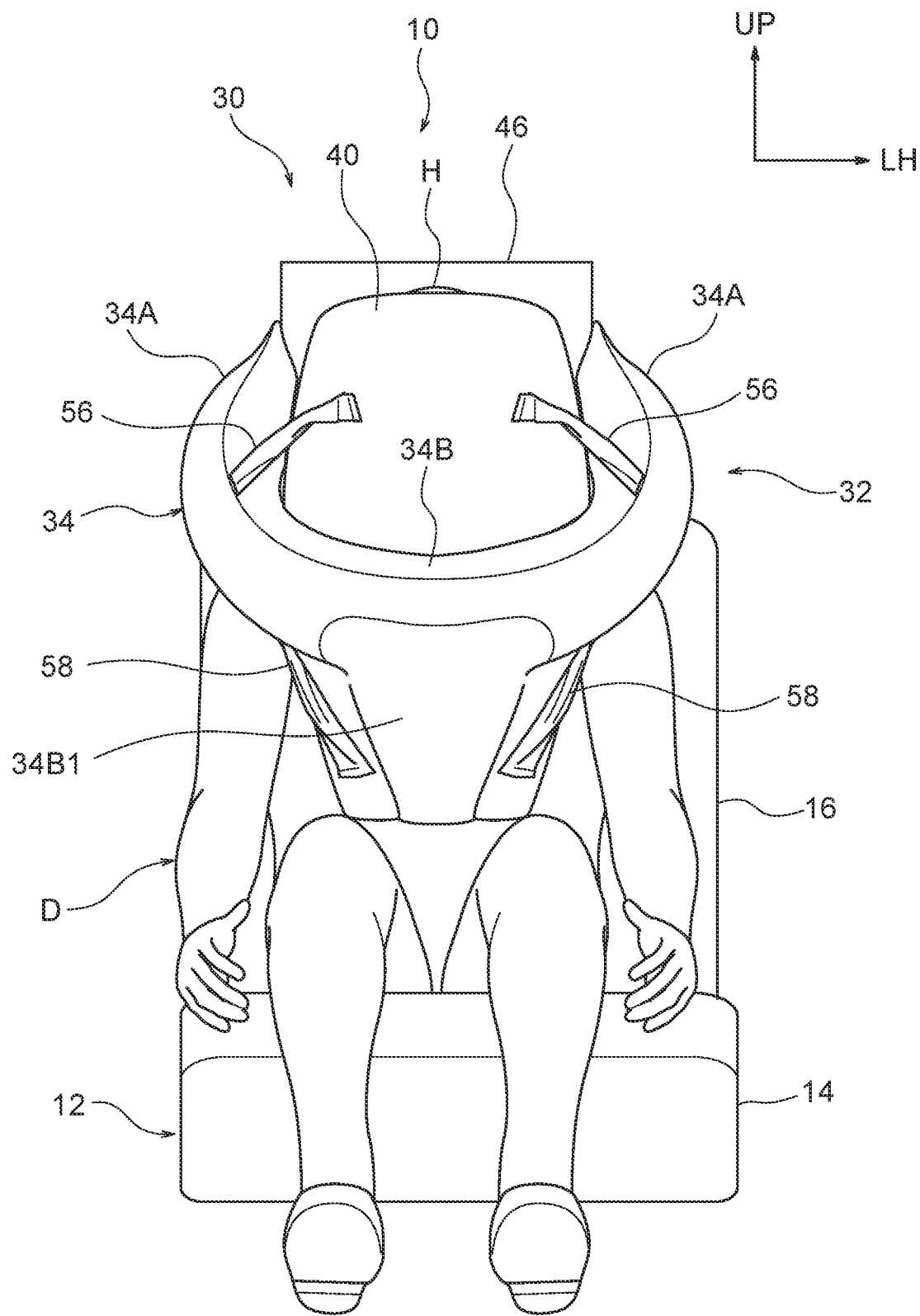
FIG. 4 is a front view illustrating the structures shown in FIG. 1 in a state of being viewed from a vehicle front side.
Figure 5:
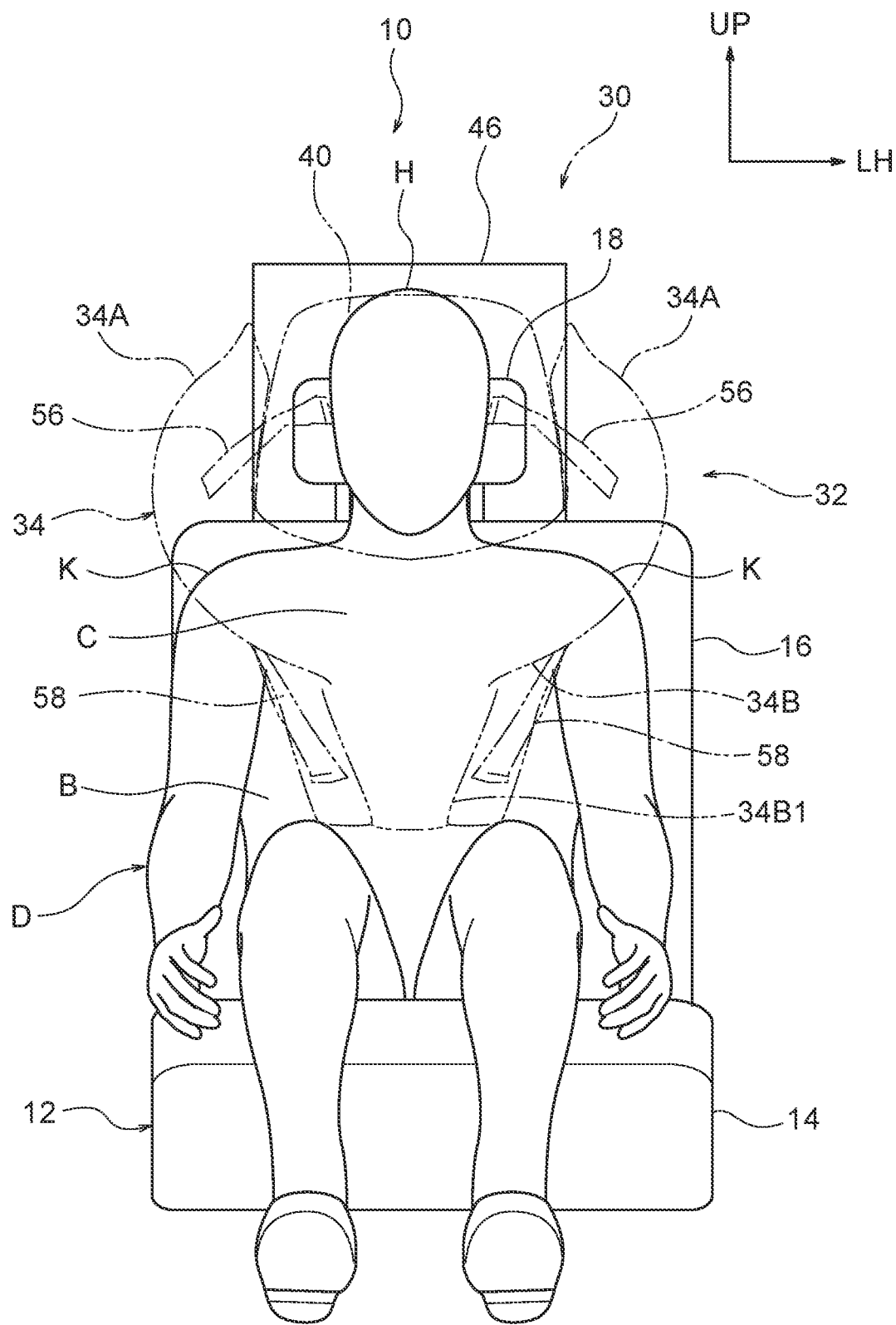
FIG. 5 is a front view illustrating the airbag of FIG. 4 in a state of viewing through the airbag.

The pair of front-rear extending portions 34A that have inflated and deployed extend in the front-rear direction at the respective left and right sides of the head H of the passenger D, and face the head H from the respective left and right sides with gaps therebetween respectively. The front end portions of the pair of front-rear extending portions 34A that have inflated and deployed are in states of being joined in the left-right direction by the connecting portion 34B that has inflated and deployed. As illustrated in FIG. 3, the front-rear chamber 34, which includes the pair of front-rear extending portions 34A and the connecting portion 34B, inflates and deploys in a U-shape that opens rearward as seen in plan view.

As illustrated in FIG. 1, FIG. 2, FIG. 4 and FIG. 5, an enlarged portion 34B1, whose dimension in the vertical direction is larger than that of the left and right both end portions of the connecting portion 34B, is provided at the left-right direction central portion of the connecting portion 34B that has inflated and deployed. This enlarged portion 34B1 protrudes-out further toward the lower side than the left and right both end portions of the connecting portion 34B. The aforementioned communication hole 48 is formed in the enlarged portion 34B1. The communication hole 48 is positioned at the rear side of the left-right direction central portion of the connecting portion 34B that has inflated and deployed. The gas from the inflators 44 passes-through the communication hole 48, and is supplied rearward into the interior of the airbag main body 40. Due thereto, the airbag main body 40 inflates and deploys at the rear of the connecting portion 34B and toward the passenger D side (the rear side), later than the front-rear chamber 34. Due to the inflation and deployment of the front-rear chamber 34, this airbag main body 40 passes through the gap between the head H of the passenger D and the ceiling (not illustrated) of the vehicle from the rear side toward the front side, and thereafter, inflates and deploys toward the rear side. The airbag main body 40 that has inflated and deployed faces the head H, the chest C and abdomen B of the passenger D from the front side with a gap therebetween.

A left and right pair of front upper tethers 56 and a left and right pair of front lower tethers 58 are attached to the airbag 32 of the above-described structure. The front upper tethers 56 and the front lower tethers 58 are structured in the shapes of elongated strips by fabric materials of nylon or polyester for example. The fabric materials that structure the front upper tethers 56 and the front lower tethers 58 are structured to be harder to stretch than the base fabrics 36, 38 that structure the front-rear chamber 34 and the base fabric 42 that structures the airbag main body 40. This difficulty of stretching can be adjusted by the material, the thickness or the like of the fabric.

The pair of front upper tethers 56 connect the front portions of the pair of front-rear extending portions 34A, and the left and right both side regions at the front portion of the upper portion, which inflates and deploys further toward the upper side than the front-rear chamber 34, of the airbag main body 40. Respective one end portions of the pair of front upper tethers 56 are respectively sewn to the left and right both side regions at the front portion of the upper portion, which inflates and deploys further toward the upper side than the front-rear chamber 34, of the airbag main body 40. Respective other end portions of the pair of front upper tethers 56 are respectively sewn to the front portions of the pair of front-rear extending portions 34A. At the time of completion of the inflation and deployment of the airbag 32, the pair of front upper tethers 56 suppress upward rotation of the airbag main body 40 around the connecting portion 34B.

The pair of front lower tethers 58 connect the front portions of the pair of front-rear extending portions 34A, and the left and right both side regions at the lower portion, which inflates and deploys further toward the lower side than the front-rear chamber 34, of the airbag main body 40. Respective one end portions of the pair of front lower tethers 58 are respectively sewn to the left and right both side regions at the lower portion, which inflates and deploys further toward the lower side than the front-rear chamber 34, of the airbag main body 40. Respective other end portions of the pair of front lower tethers 58 are respectively sewn to the front portions of the pair of front-rear extending portions 34A. At the time of completion of the inflation and deployment of the airbag 32, the pair of front lower tethers 58 suppress downward rotation of the airbag main body 40 around the connecting portion 34B.

The above-described airbag device 30 has an unillustrated electronic control device (ECU) that controls operation of the pair of inflators 44. The control device is electrically connected to the pair of inflators 44 and to an unillustrated collision sensor. On the basis of information from the collision sensor, the control device can sense or predict, for each type of collision described hereinafter, the occurrence of a front collision of any of various types (or the fact that a front collision is inevitable) at the automobile to which the airbag device 30 is applied.

When the control device senses or predicts a front collision on the basis of information from the collision sensor, the control device causes the pair of inflators 44 to operate. Note that, in addition to full-overlap front collisions, offset front collisions such as oblique collisions and small overlap collisions and the like are included among the types of front collisions in which the control device causes the inflators 44 to operate.

When the pair of inflators 44 operate, due to the pressure of the gas generated within the pair of inflator accommodating portions 34C of the front-rear chamber 34, the folded-up state of the pair of front-rear extending portions 34A comes undone from the rear end sides (the proximal end sides) thereof, and the pair of front-rear extending portions 34A inflate and deploy toward the front side. Due to the inflation and deployment of this pair of front-rear extending portions 34A, the region at the front side of the airbag 32, which includes the connecting portion 34B and the airbag main body 40, is deployed toward the front side. At this time, the front side region of the airbag 32 passes through the gap that is between the head H of the passenger D and the ceiling of the vehicle, from the rear side toward the front side. Thereafter, the gas supplied to the connecting portion 34B of the front-rear chamber 34 passes-through the communication hole 48, and gas is supplied to the airbag main body 40, and the airbag main body 40 inflates and deploys toward the passenger D side.

Figure 8:
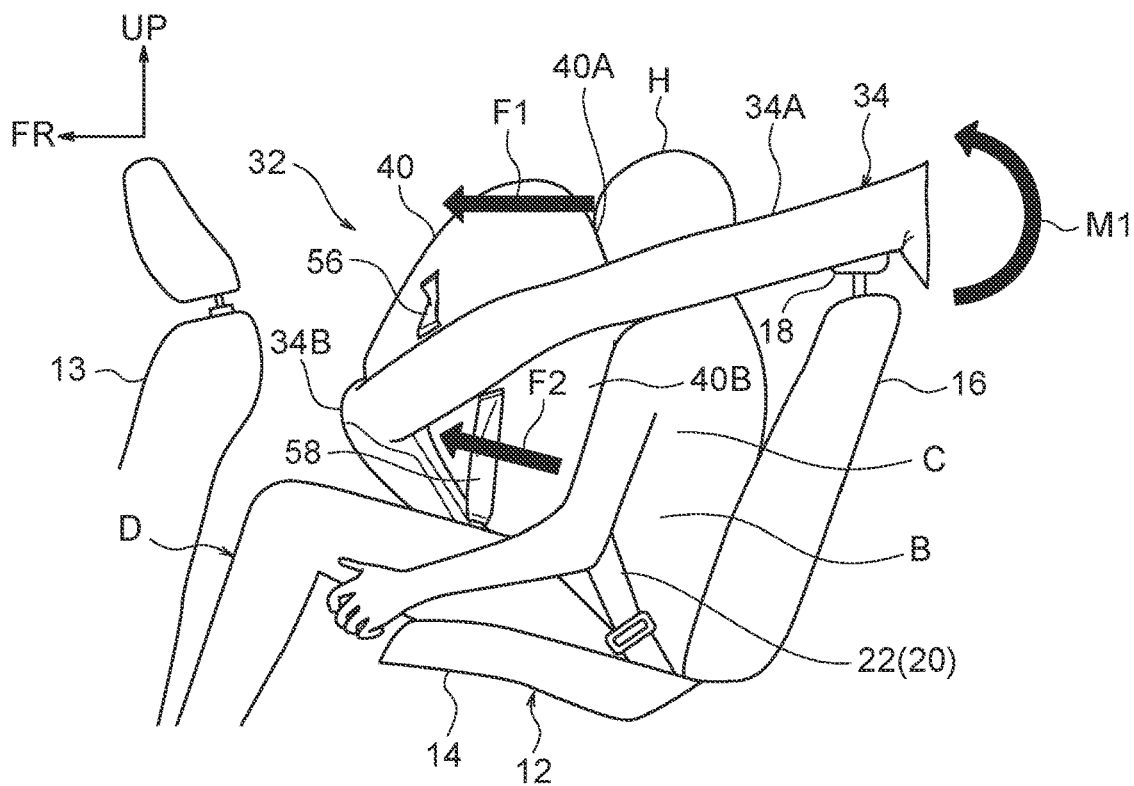
FIG. 8 is a side view illustrating a state in an initial stage of passenger restraining by the airbag.

As illustrated in FIG. 8, the airbag main body 40 has a chest/abdomen restraining portion 40B that restrains the chest C and the abdomen B of the passenger D further toward the lower side than the front-rear chamber 34, and a head restraining portion 40A that restrains the head H of the passenger D further toward the upper side than the front-rear chamber 34. The shape of the airbag main body 40 is set such that the head H is restrained by the head restraining portion 40A before the restraining of the chest C and the abdomen B by the chest/abdomen restraining portion 40B. The head restraining portion 40A corresponds to the "downward force applying portion" in the present disclosure. Note that reference numeral 13 in FIG. 8 is a front seat of the vehicle.

Operation and Effects

Operation and effects of the first embodiment are described next.

The passenger protection device 10 relating to the present embodiment has the vehicle seat 12 in which the passenger D of the vehicle (automobile) sits, and the airbag device 30 that protects the passenger D at the time of a collision of the vehicle. At this airbag device 30, at the time of a collision of the vehicle, gas generated from the pair of inflators 44 is supplied to the airbag 32, and the airbag 32 inflates and deploys from the rear side of the upper portion of the vehicle seat 12 toward the front side.

The airbag 32 has the front-rear chamber 34 and the airbag main body 40. The front-rear chamber 34 has the left and right pair of front-rear extending portions 34A that pass the respective left and right sides of the head H of the passenger D and inflate and deploy toward the front side, and the connecting portion 34B that connects the front end portions of the pair of front-rear extending portions 34A in the left-right direction. The airbag main body 40 inflates and deploys at the rear side of the connecting portion 34B toward the passenger D side, later than the front-rear chamber 34. This airbag main body 40 has the chest/abdomen restraining portion 40B and the head restraining portion 40A. The chest/abdomen restraining portion 40B restrains the chest C and the abdomen B of the passenger D further toward the lower side than the front-rear chamber 34. Before the restraining of the chest C and the abdomen B by the chest/abdomen restraining portion 40B, the head restraining portion 40A restrains the head H of the passenger D further toward the upper side than the front-rear chamber 34. Due to the restraining of the head H by the head restraining portion 40A, moment M1 (see FIG. 8) toward the lower side is applied around the proximal end portions of the pair of front-rear extending portions 34A to the airbag main body 40. As a result, the airbag 32 being inadvertently displaced toward the upper side can be suppressed.

Namely, in the present embodiment, in the initial stage of restraining of the passenger D by the airbag 32, before load F2 is input from the chest C and the abdomen B to the chest/abdomen restraining portion 40B of the airbag main body 40, load F1 is input from the head H to the head restraining portion 40A of the airbag main body 40. As a result, the moment M1 toward the lower side is applied around the proximal end portions of the pair of front-rear extending portions 34A to the airbag main body 40 by the load F2. As a result, the moment toward the upper side that acts on the airbag 32 owing to the load F2 is cancelled, and inadvertent displacement of the airbag 32 toward the upper side can be suppressed.

Figure 9:
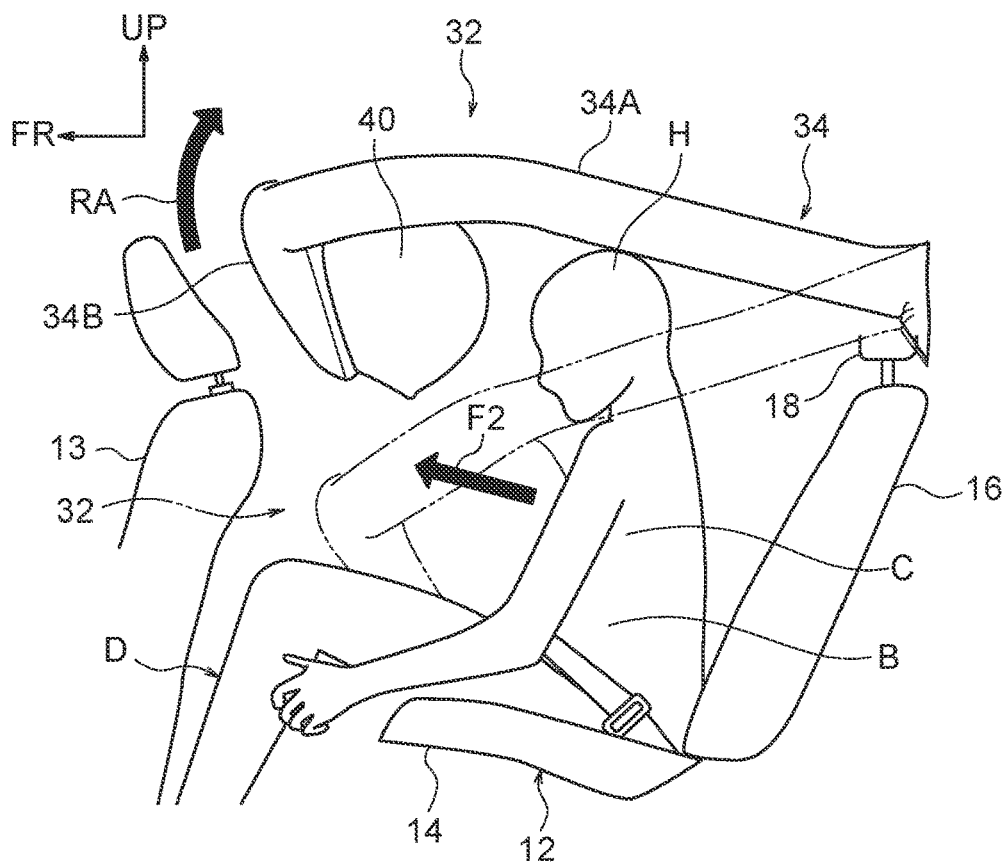
FIG. 9 is a side view for explaining a situation in which an airbag relating to a comparative example escapes toward a seat upper side at a time of passenger restraining.
Figure 10:
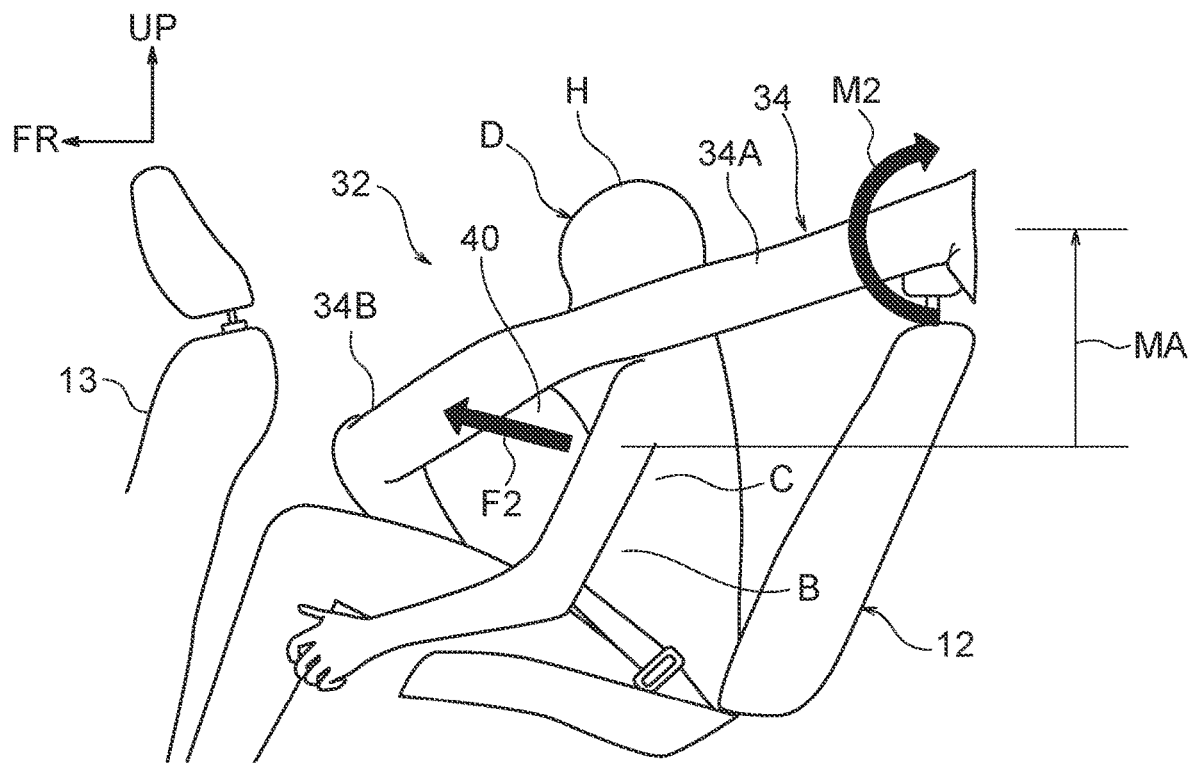
FIG. 10 is a side view for explaining a moment applied to an airbag relating to a first comparative example.
Figure 11:
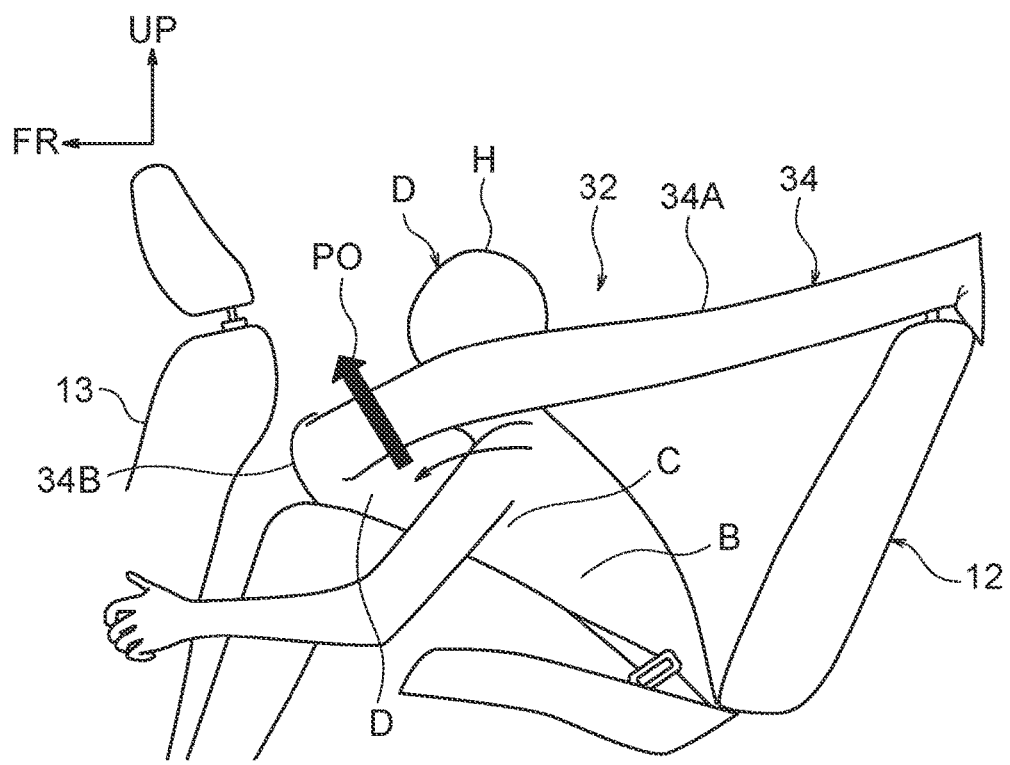
FIG. 11 is a side view for explaining a situation in which an airbag main body is pushed out toward an obliquely front and upper side of a seat, from an intermediate stage to a latter stage of passenger restraining by the airbag relating to the first comparative example.

The above-described effect is described in further detail by using a first comparative example illustrated in FIG. 9 through FIG. 11. Note that, in FIG. 9 through FIG. 11, structures that are similar to those of the present embodiment are denoted by the same reference numerals. In this first comparative example, the airbag main body 40 does not have the head restraining portion 40A, but structures other than this are similar to those of the present embodiment. In the first comparative example, in the initial stage of restraining of the passenger D by the airbag 32, due to the load F2 being inputted from the chest C and the abdomen B to the chest/abdomen restraining portion 40B of the airbag main body 40, the airbag 32 escapes toward the upper side (refer to arrow RA in FIG. 9). This is because, as illustrated by arrow MA in FIG. 10, the proximal end portions of the pair of front-rear extending portions 34A that are the roots of the airbag 32 are further upward than the place where the load F2 is inputted to the airbag main body 40, and therefore, moment M2 toward the upper side around the proximal end portions of the pair of front-rear extending portions 34A acts on the airbag 32. In the present embodiment, because the moment M2 can be cancelled by the above-described moment M1, inadvertent upward displacement of the airbag 32 can be suppressed.

Further, in this first comparative example, as illustrated in FIG. 11, from an intermediate stage to the latter stage of the passenger restraining by the airbag 32, the airbag main body 40 becomes sandwiched in between the upper body and the thighs F of the passenger D who tilts forward due to the impact of the vehicle collision. Due thereto, the airbag main body 40 is pushed-out obliquely forward and upward (refer to arrow PO in FIG. 11), and the airbag 32 starts being inadvertently displaced toward the upper side. With regard to this point, in the present embodiment, upward displacement of the airbag 32 due to the above-described pushing-out can be suppressed due to the load F1 continuing to be applied to the head restraining portion 40A from the initial stage through the latter stage of the passenger restraining by the airbag 32.

Further, in the present embodiment, gas from the inflators 44 is supplied to the airbag main body 40 via the communication hole 48 that is positioned at the rear side of the left-right direction central portion of the connecting portion 34B of the front-rear chamber 34 in the inflated and deployed state of the front-rear chamber 34. Namely, the gas, which has passed through the pair of front-rear extending portions 34A and the connecting portion 34B of the front-rear chamber 34, is supplied from the communication hole 48 toward the rear side and into the airbag main body 40. Due thereto, the airbag main body 40 can be inflated and deployed sufficiently later than the front-rear chamber 34. As a result, for example, it is easy to cause the airbag main body 40 to pass through the narrow gap between the head H of the passenger D and the ceiling (not illustrated) of the vehicle, and to inflate and deploy the airbag 32.

Further, in the present embodiment, after the inflation and deployment of the front-rear chamber 34, the airbag main body 40 inflates and deploys toward the passenger D side (i.e., the rear side), at the rear side of the connecting portion 34B. Due thereto, the gap between the airbag main body 40 and the passenger D becomes small. As a result, the passenger D is restrained by the airbag main body 40 at an early stage, and therefore, the performance of the airbag main body 40 of restraining the passenger D at an early stage can be improved.

Namely, in the present embodiment, the airbag main body 40 inflates and deploys toward the rear side after passing through the gap between the head H of the passenger D and the ceiling of the vehicle from the rear side toward the front side due to the inflation and deployment of the front-rear chamber 34. Due thereto, it is easy to prevent the airbag main body 40 from becoming stuck in the aforementioned gap, and therefore, it is easy to prevent poor deployment of the airbag.

Other embodiments of the present disclosure are described next. Note that structures and operations that are basically similar to those of embodiments described previously are denoted by the same reference numerals as in the previously-described embodiments, and description thereof is omitted.

Second Embodiment

Figure 12:
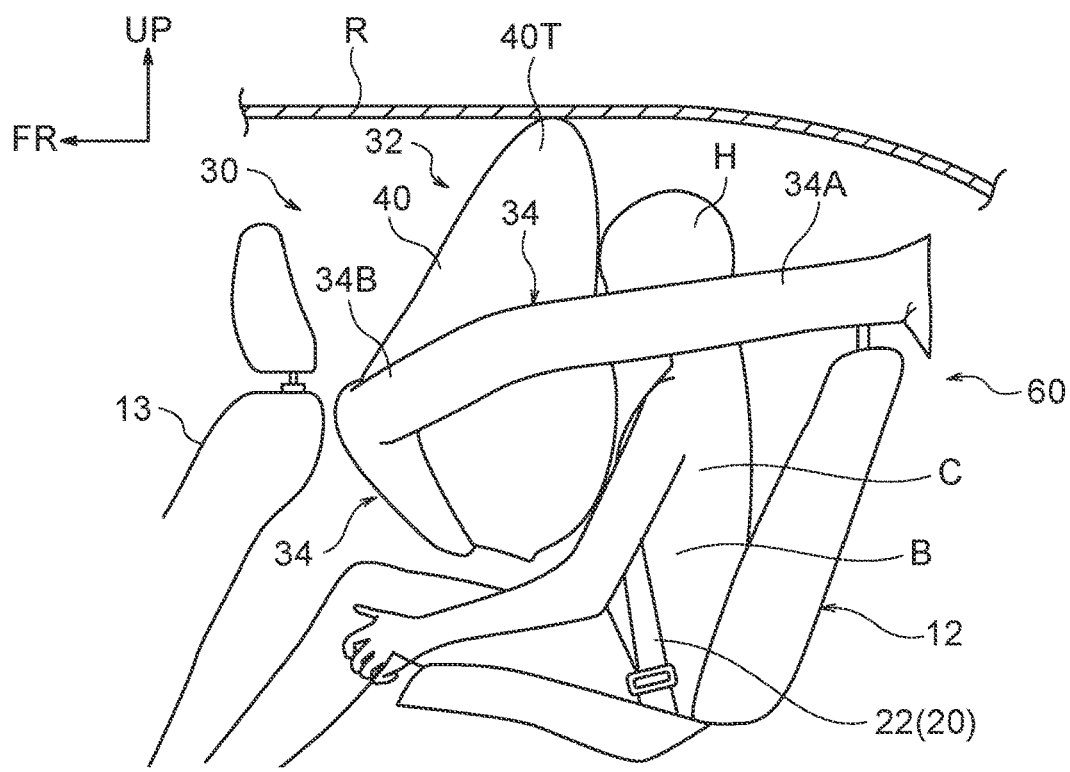
FIG. 12 is a side view illustrating a state in an initial stage of passenger restraining by the airbag in a passenger protection device relating to a second embodiment.

A state in the initial stage of passenger restraining by the airbag 32 in a passenger protection device 60 relating to a second embodiment is illustrated in a side view in FIG. 12. A state in an intermediate stage of passenger restraining by the airbag 32 in the passenger protection device 60 relating to the second embodiment is illustrated in a side view in FIG. 13. Note that illustration of the module case 46 is omitted in FIG. 12 and FIG. 13.

In this embodiment, ceiling abutting portion 40T is provided at the upper portion of the airbag main body 40, and the upper portion of the airbag main body 40 is enlarged upward. The upper portion of the airbag main body 40 at which the ceiling abutting portion 40T is provided is formed such that the width thereof in the front-rear direction decreases toward the upper side, when the inflated and deployed state of the airbag main body 40 is viewed from the side. As illustrated in FIG. 12, in the initial stage of passenger restraining by the airbag 32, the upper end portion of the ceiling abutting portion 40T abuts ceiling R of the vehicle. Due thereto, downwardly-directed reaction force is applied from the ceiling R to the airbag main body 40, i.e., the airbag 32, and therefore, the airbag 32 inadvertently being displaced toward the upper side in the initial stage of passenger restraining can be suppressed.

Figure 13:
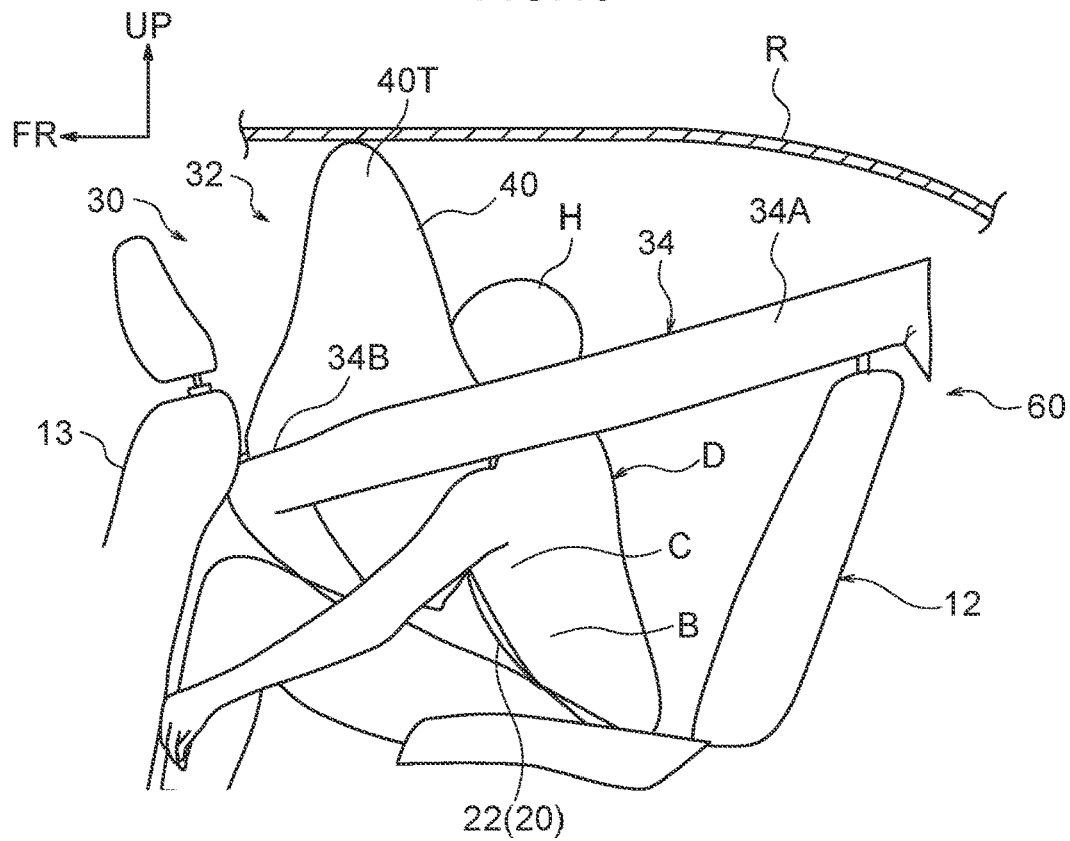
FIG. 13 is a side view illustrating a state in an intermediate stage of passenger restraining by the airbag in the passenger protection device relating to the second embodiment.

As illustrated in FIG. 13, from an intermediate stage to the latter stage of passenger restraining by the airbag 32, the airbag main body 40 is sandwiched-in between the upper body and the thighs F of the passenger D who tilts forward due to the impact of the vehicle collision. Due thereto, the airbag main body 40 is pushed-out obliquely frontward and upward, but, due to the abutting of the ceiling abutting portion 40T and the ceiling R, upward displacement of the airbag 32 is suppressed.

Figure 14:
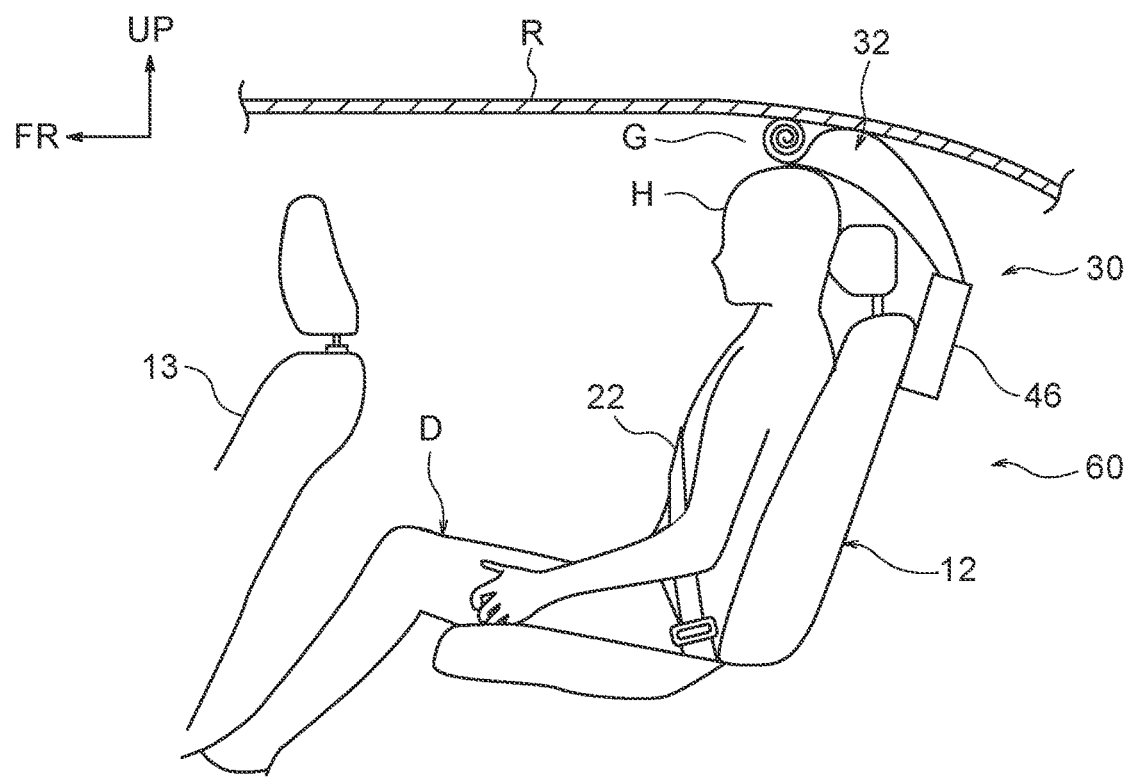
FIG. 14 is a side view illustrating a state in the midst of passage of the airbag, which is in the initial stage of inflation and deployment, through a gap between a head of a passenger and a ceiling of a vehicle in the passenger protection device relating to the second embodiment.
Figure 15:
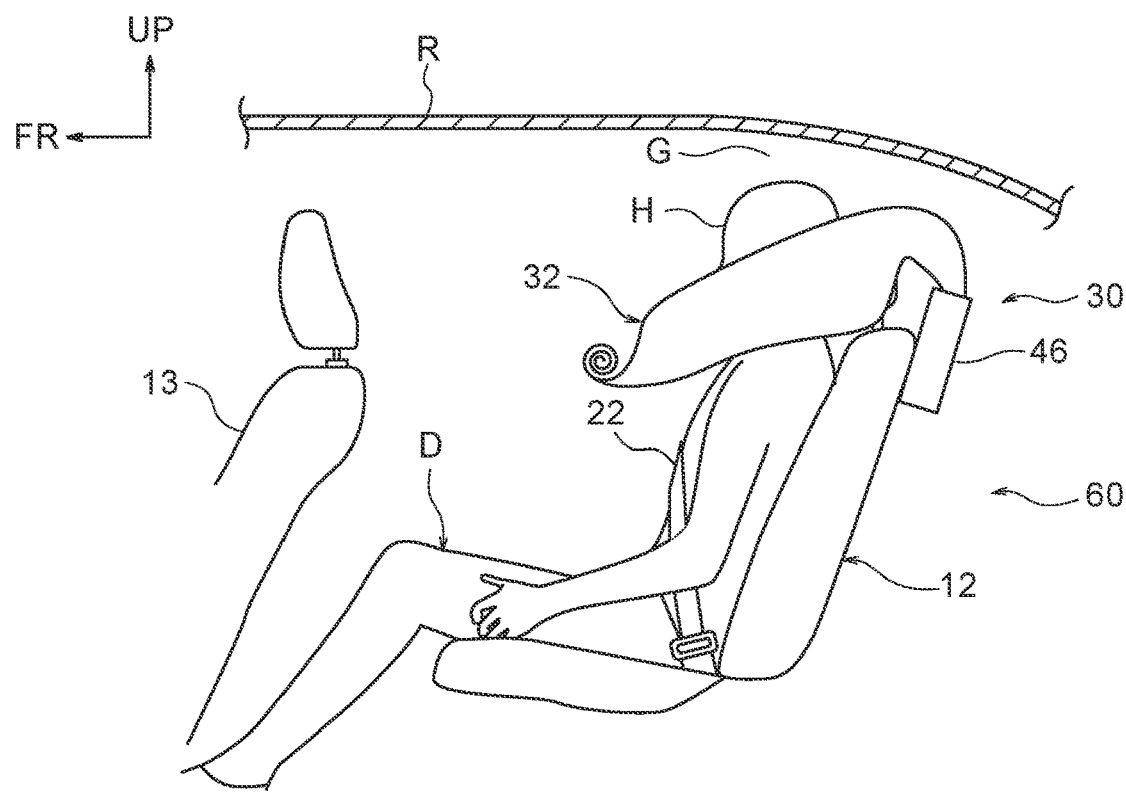
FIG. 15 is a side view corresponding to FIG. 14 and illustrating an intermediate stage of inflation and deployment of the airbag.
Figure 16:
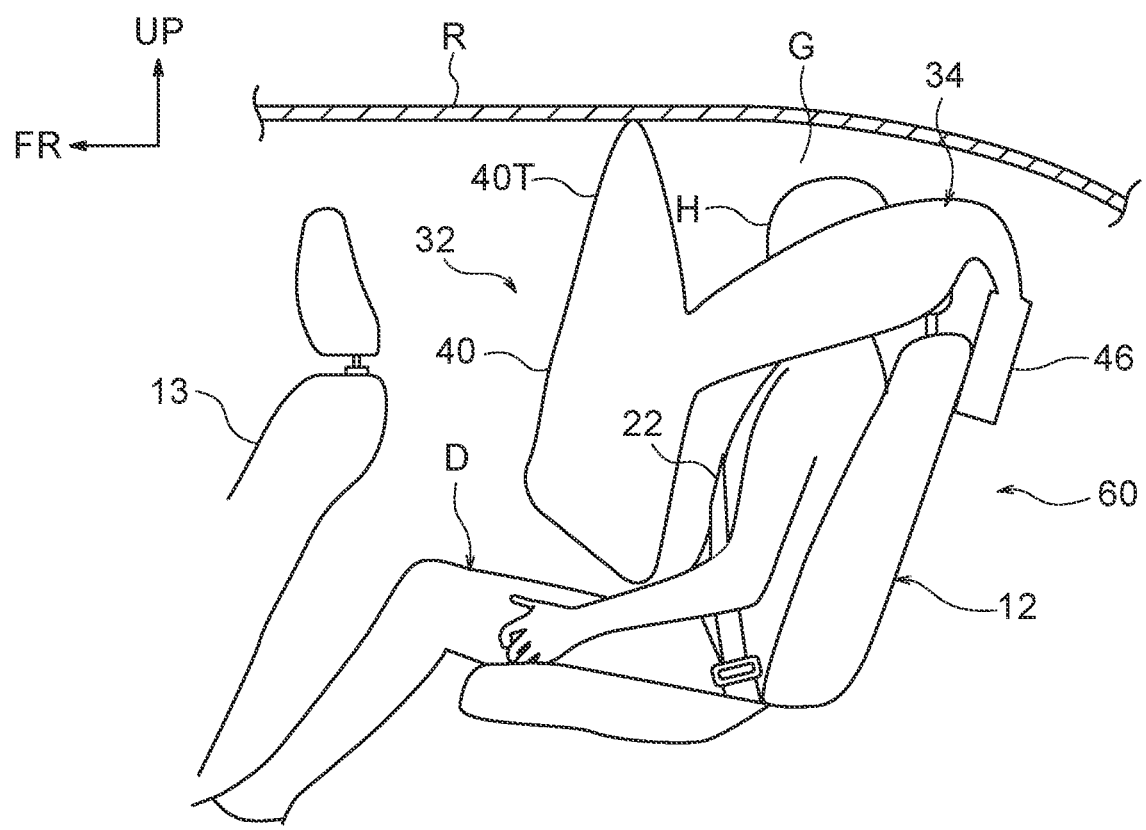
FIG. 16 is a side view corresponding to FIG. 14 and illustrating a state in which inflation and deployment of the airbag have been completed.

In the same way as in the first embodiment, the airbag main body 40, at which the ceiling abutting portion 40T is provided as described above, inflates and deploys later than the front-rear chamber 34 due to the gas that has passed through the front-rear chamber 34 being supplied through the communication hole 48. Therefore, as illustrated in FIG. 14 through FIG. 16, the airbag main body 40 inflates and deploys after a portion of the airbag 32 passes through gap G between the head H of the passenger D and the ceiling R of the vehicle. In this embodiment as well, effects that are basically similar to those of the first embodiment are obtained. Note that, in FIG. 14 through FIG. 16, the airbag 32 is illustrated schematically for convenience of explanation. Further, in this embodiment, the head restraining portion 40A does not have to restrain the head H before the restraining of the chest C and the abdomen B by the chest/abdomen restraining portion 40B.

Third Embodiment

Figure 17A:
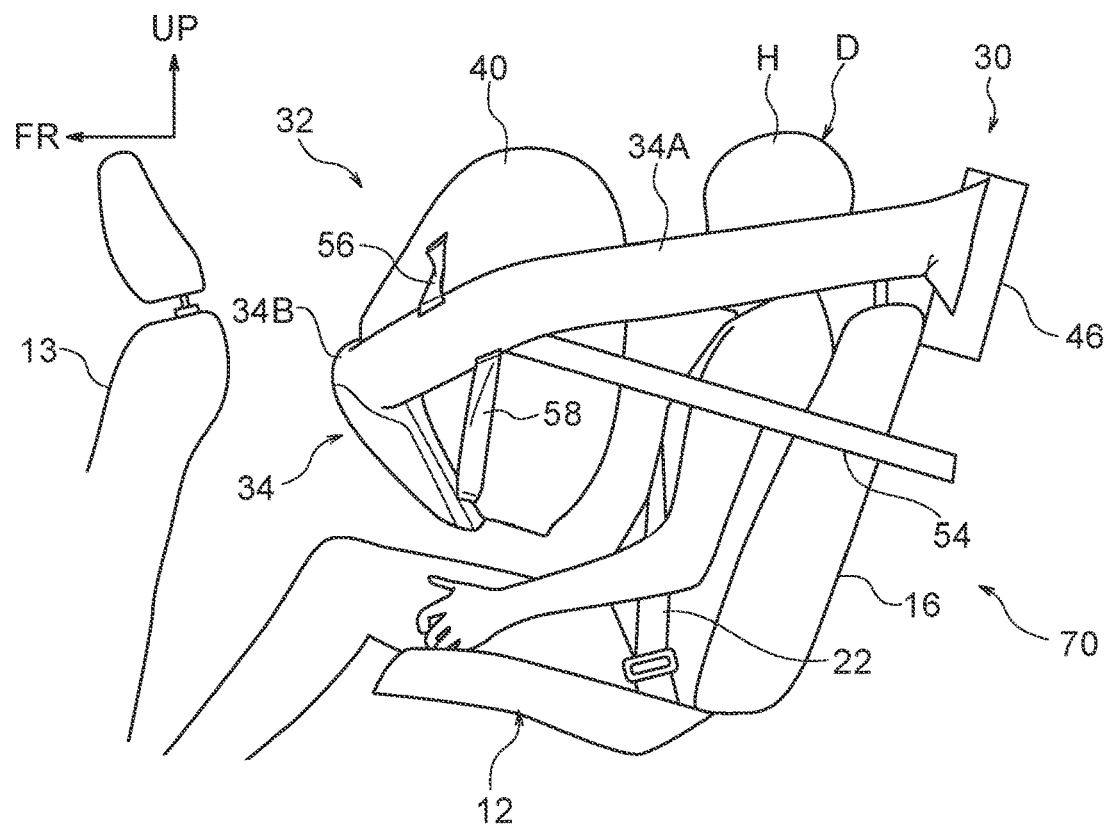
FIG. 17A is a side view illustrating a state in which inflation and deployment of the airbag have been completed in a passenger protection device relating to a third embodiment.

A state in which inflation and deployment of the airbag 32 have been completed in a passenger protection device 70 relating to a third embodiment is illustrated in a side view in FIG. 17A. A state in the latter stage of passenger restraining by the airbag 32 at the passenger protection device 70 relating to the third embodiment is illustrated in a side view in FIG. 17B. Note that illustration of the module case 46 is omitted in FIG. 17B.

In this embodiment, a left and right pair of rear tethers 54 that are attached to the airbag 32 are provided. Respective one end portions of the pair of rear tethers 54 are attached (sewn) to respective length direction intermediate portions of the pair of front-rear extending portions 34A (in detail, the front portions of the respective front-rear extending portions 34A that have inflated and deployed). The respective other end portions of the pair of rear tethers 54 are respectively attached to the seatback 16 or the unillustrated vehicle body, further toward the rear side than the passenger D. In the state in which the airbag 32 has inflated and deployed, the pair of rear tethers 54 extend in the front-rear direction beneath the pair of front-rear extending portions 34A. In this state, the pair of rear tethers 54 are in postures of being inclined downward while heading rearward. Due thereto, the pair of front-rear extending portions 34A are pulled-in obliquely rearward and downward by the pair of rear tethers 54 (refer to arrow PI in FIG. 17B). Due thereto, at the time of completion of the inflation and deployment of the airbag 32, the airbag 32 swaying in the vertical direction and the front-rear direction is suppressed.

Further, due to the pair of front-rear extending portions 34A being pulled-in by the pair of rear tethers 54 in this way, a downwardly-directed component of force is applied to the airbag 32. Therefore, the moment M1 toward the lower side around the proximal end portions of the pair of front-rear extending portions 34A is applied to the airbag 32. Due thereto, in the same way as in the first embodiment, the airbag 32 being displaced inadvertently toward the upper side can be suppressed. Further, at the time of passenger restraining by the airbag main body 40, the pair of rear tethers 54 are stretched in the front-rear direction together with the front-rear chamber 34. These rear tethers 54, together with the front-rear chamber 34, receive and support the load that is applied from the passenger D to the airbag main body 40.

Figure 17B:
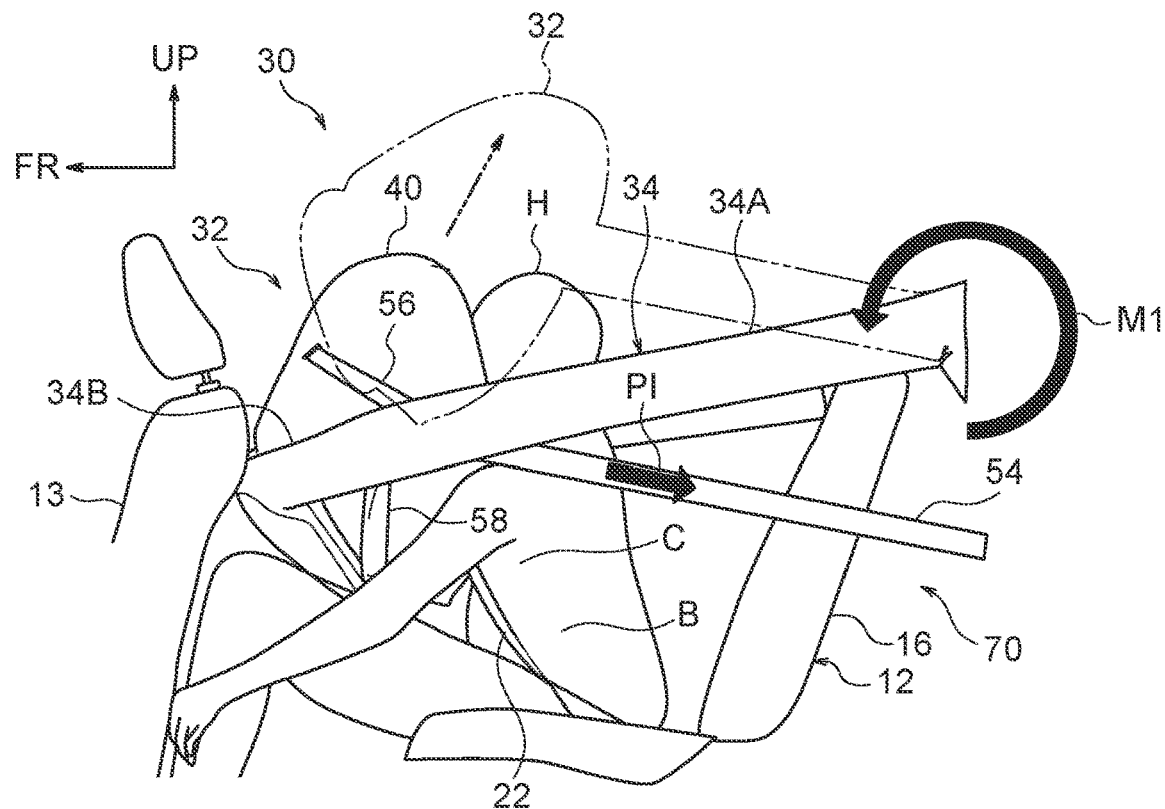
FIG. 17B is a side view illustrating a state in a latter stage of passenger restraining by the airbag in the passenger protection device relating to the third embodiment.

Due to the pair of front-rear extending portions 34A being pulled-in as described above, at the time of passenger restraining by the airbag 32, the lower surfaces of the pair of front-rear extending portions 34A abut left and right shoulders K of the passenger D (see FIG. 17B). Due thereto, the vertical direction position of the airbag main body 40 with respect to the head H of the passenger D can be stabilized, regardless of differences in physiques of the passengers D. Note that, although the passenger D is an AM50 in the present embodiment, the lengths of the pair of rear tethers 54 are set such that the lower surfaces of the pair of front-rear extending portions 34A abut the left and right shoulders K of the passenger D even in cases in which the passenger D is an AM95 (95th percentile U.S. adult male) or is an AF05 (5th percentile U.S. adult female). In this embodiment, the head restraining portion 40A does not have to restrain the head H before the restraining of the chest C and the abdomen B by the chest/abdomen restraining portion 40B.

Fourth Embodiment

Figure 18:
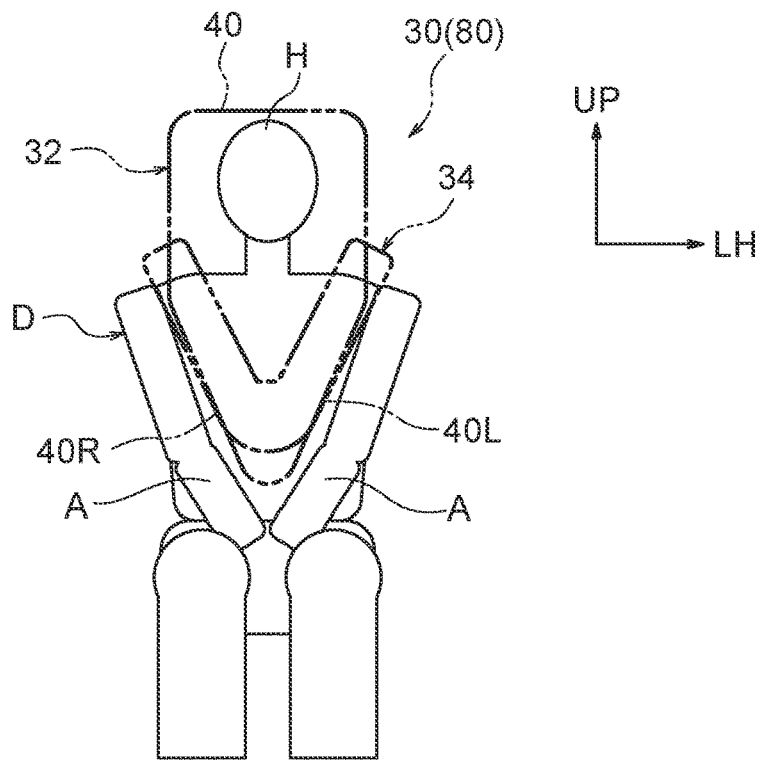
FIG. 18 is a front view illustrating a state in which inflation and deployment of the airbag have been completed in a passenger protection device relating to a fourth embodiment.
Figure 19:
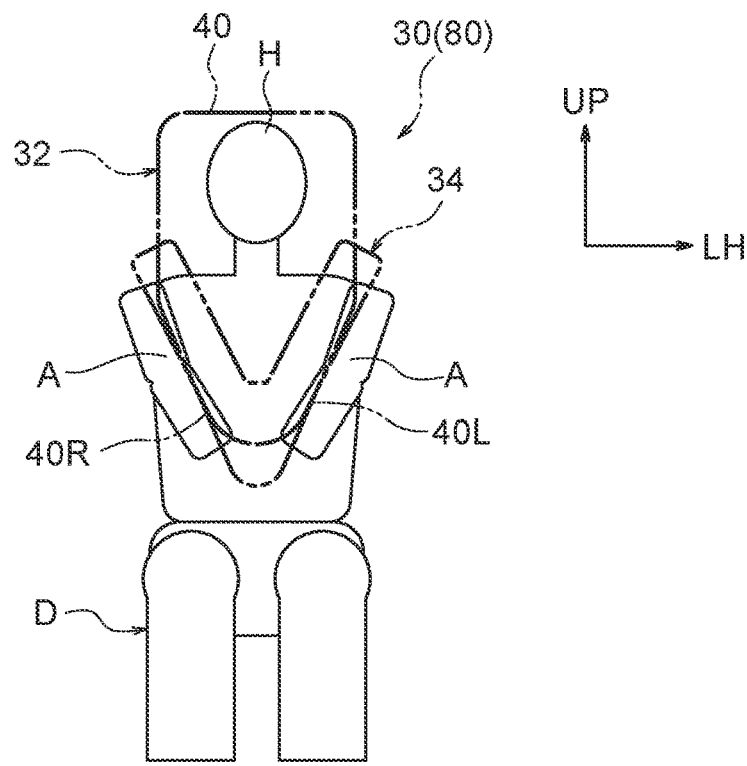
FIG. 19 is a front view illustrating a state in an intermediate stage of passenger restraining by the airbag in the passenger protection device relating to the fourth embodiment.
Figure 20:
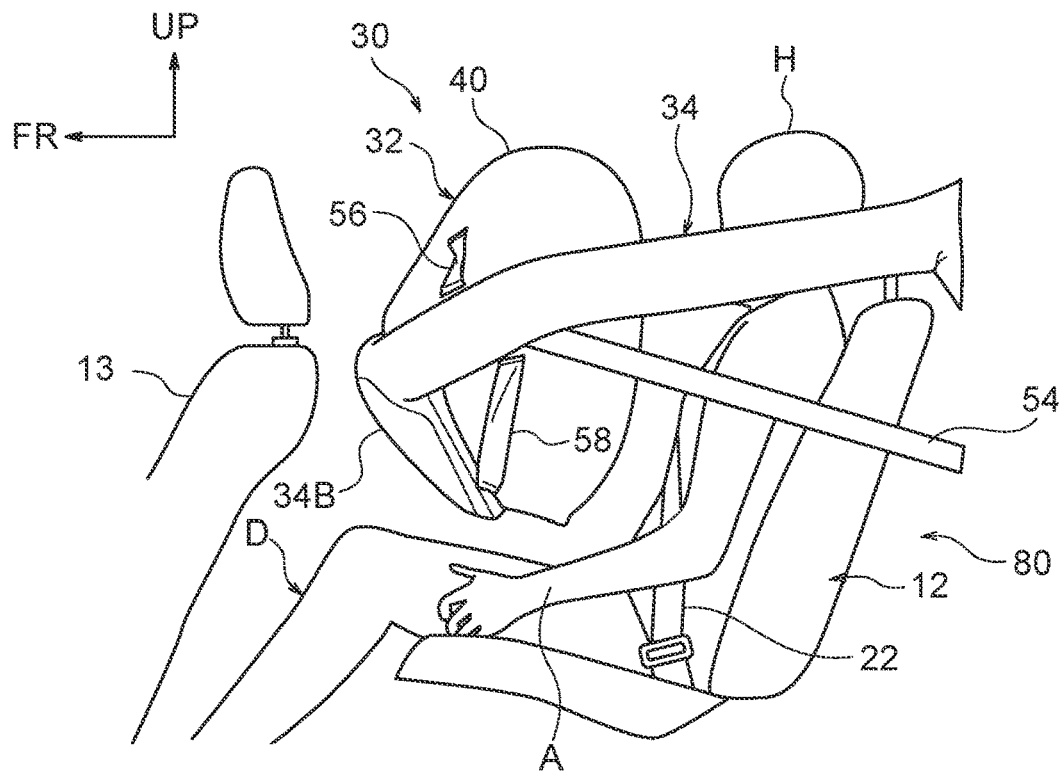
FIG. 20 is a side view illustrating a state in which inflation and deployment of the airbag have been completed in the passenger protection device relating to the fourth embodiment.
Figure 21:
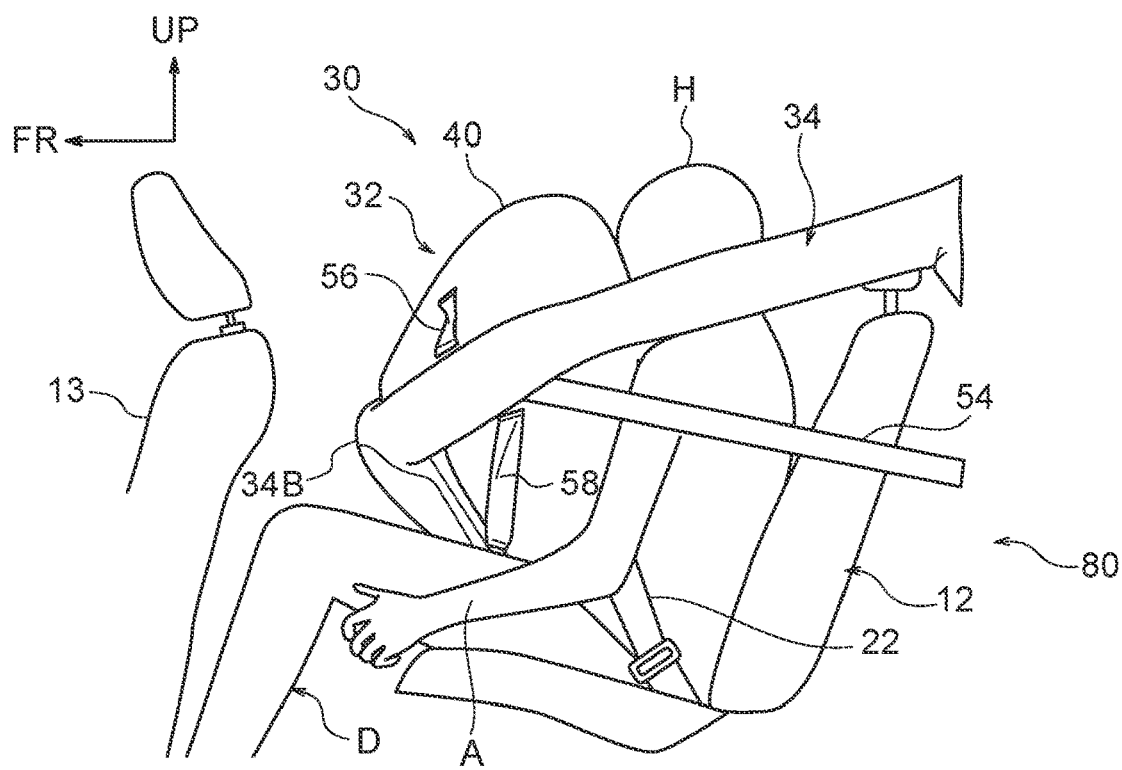
FIG. 21 is a side view illustrating a state in an initial stage of passenger restraining by the airbag in the passenger protection device relating to the fourth embodiment.
Figure 22:
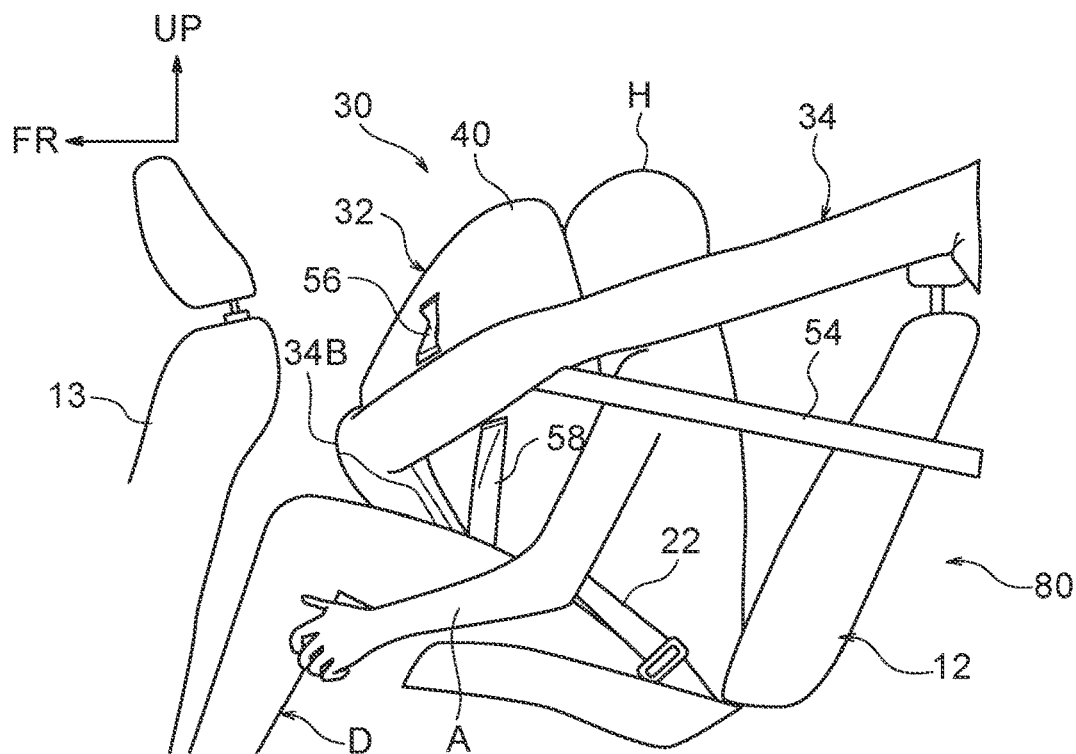
FIG. 22 is a side view illustrating a state in an intermediate stage of passenger restraining by the airbag in the passenger protection device relating to the fourth embodiment.

A state in which inflation and deployment of the airbag 32 have been completed in a passenger protection device 80 relating to a fourth embodiment is illustrated in a front view in FIG. 18. A state in an intermediate stage of passenger restraining by the airbag 32 in the passenger protection device 80 relating to the fourth embodiment is illustrated in a front view in FIG. 19. Note that, in FIG. 18 and FIG. 19, the airbag 32 and the passenger D are illustrated schematically for convenience of explanation.

In the present embodiment, the lower portion of the airbag main body 40 is structured so as to be formed in an upside-down triangle shape when the inflated and deployed state of the airbag 32 is viewed from the front-rear direction. This airbag main body 40 is formed such that the left-right direction dimension thereof in the inflated and deployed state gradually decreases toward the lower end portion. At the lower portion of the airbag main body 40 in the inflated and deployed state, left and right side surfaces 40L, 40R are inclined so as to approach one another while heading toward the lower side. In this embodiment, structures other than that described above are similar to those of the third embodiment. However, this embodiment may be structured such that the pair of rear tethers 54 are omitted.

Figure 23:
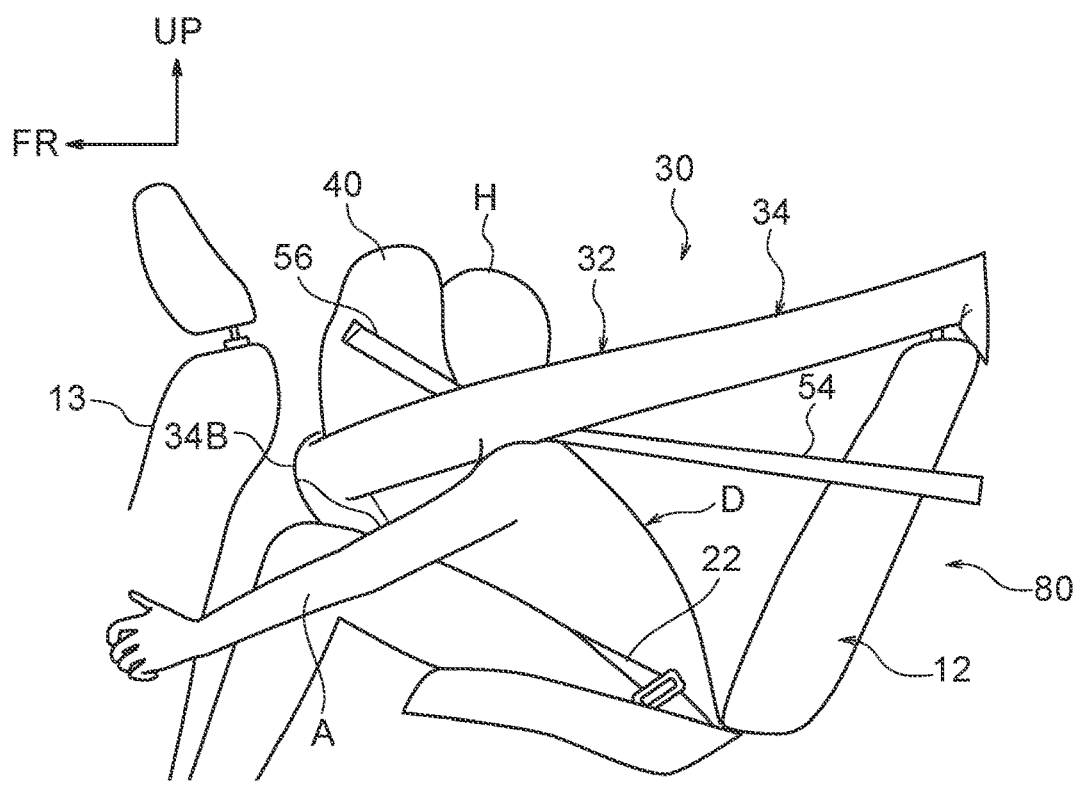
FIG. 23 is a side view illustrating a state in a latter stage of passenger restraining by the airbag in the passenger protection device relating to the fourth embodiment.

As illustrated in FIG. 20 through FIG. 23, at the time of passenger restraining by the airbag 32, the front-rear chamber 34 is stretched in the front-rear direction, and the airbag main body 40 is compressed in the front-rear direction. As illustrated in FIG. 23, in the latter stage of passenger restraining by the airbag 32, arms A of the passenger are flung-up obliquely frontward and upward due to the impact of the vehicle collision. As illustrated in FIG. 18, before passenger restraining by the airbag 32, if the arms A are in a vicinity of the left-right direction center of the body of the passenger D, the arms A that are flung-up as described above interfere with the airbag main body 40. Even in such a case, due to the arms A slidingly contacting the side surfaces 40L, 40R that are inclined as described above, the arms A are pushed aside toward the outer sides in the left-right direction. As a result, the upward lifting force that is applied to the airbag main body 40 from the arms A can be made to be small.

Figure 24:
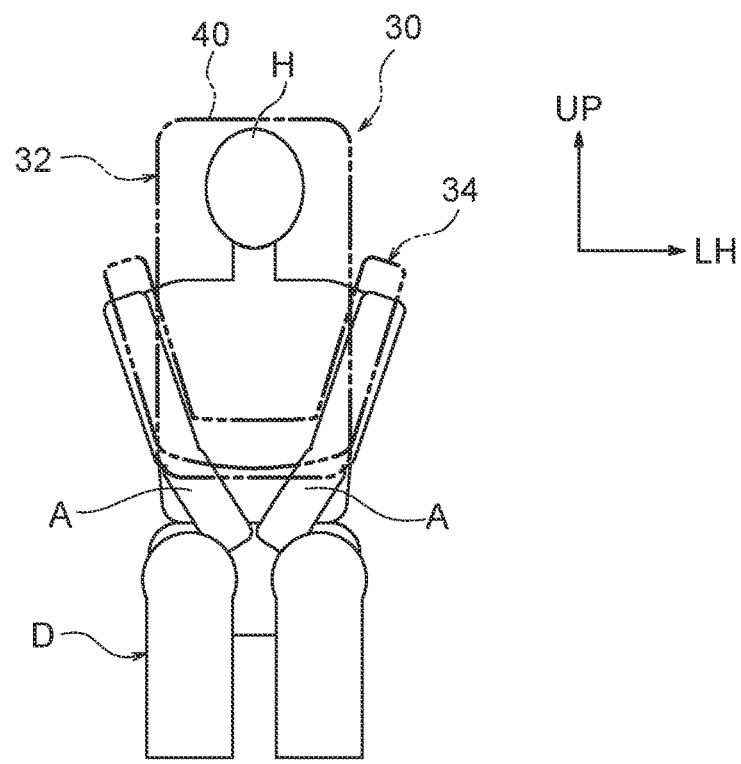
FIG. 24 is a front view illustrating a state in which inflation and deployment of an airbag have been completed in a passenger protection device relating to a second comparative example.
Figure 25:
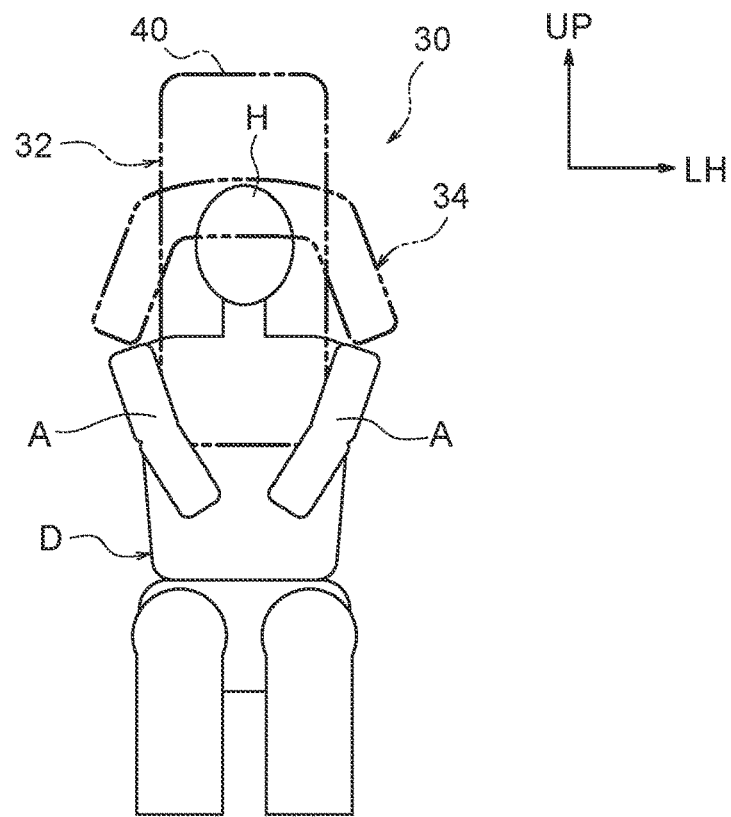
FIG. 25 is a front view illustrating a state in a latter stage of passenger restraining by the airbag in the passenger protection device relating to the second comparative example.

Namely, in a structure in which the left-right direction dimension in the inflated and deployed state of the airbag main body 40 is not decreased gradually toward the lower end portion of the airbag main body 40 as in a second comparative example illustrated in FIG. 24 and FIG. 25, the arms A that are flung obliquely forward and upward interfere with the airbag main body 40, and due thereto, there is the possibility that the airbag 32 will be lifted-up toward the upper side (see FIG. 25). In the present embodiment, the lifting force applied from the arms A to the airbag main body 40 can be made to be small, and therefore, the airbag 32 being inadvertently displaced toward the upper side can be suppressed.

Fifth Embodiment

Figure 26:
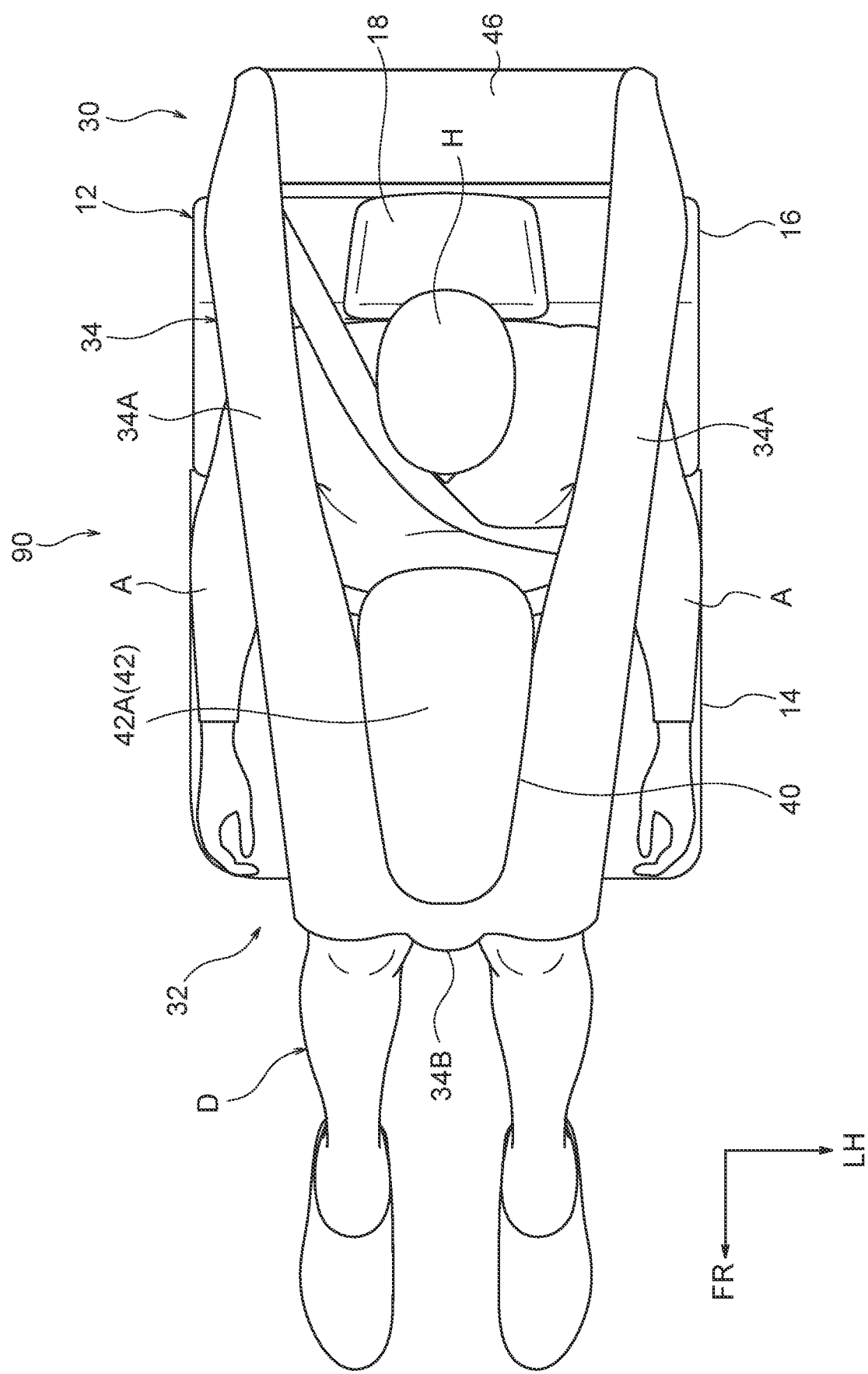
FIG. 26 is a plan view illustrating a state in which inflation and deployment of the airbag have been completed in a passenger protection device relating to a fifth embodiment.
Figure 27:
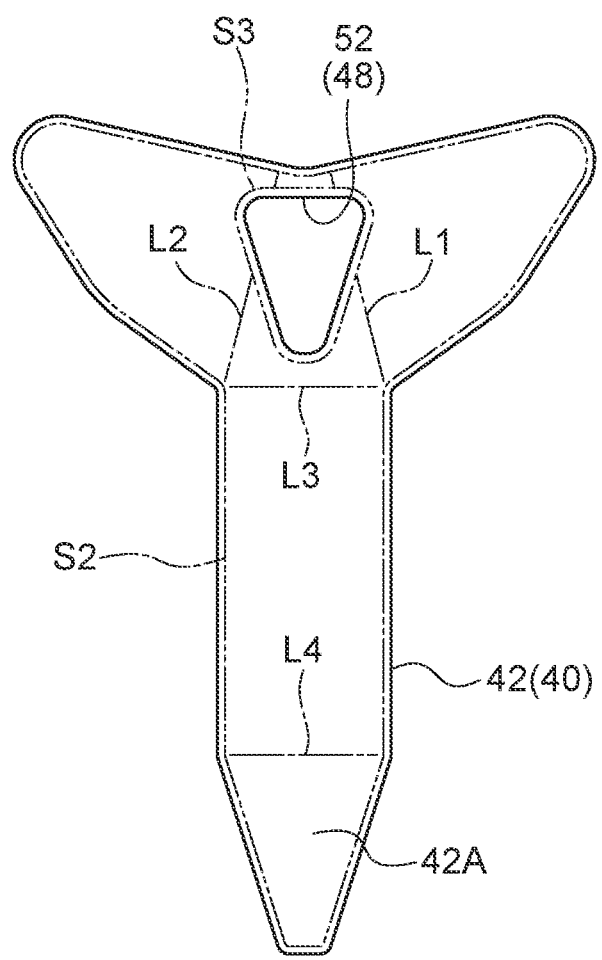
FIG. 27 is an deployed view illustrating an airbag main body of the airbag in the fifth embodiment.

A state in which inflation and deployment of the airbag 32 have been completed in a passenger protection device 90 relating to a fifth embodiment is illustrated in a plan view in FIG. 26. In this embodiment, the airbag main body 40 is formed such that the seat left-right direction dimension thereof in the inflated and deployed state is smaller at the seat front side than at the seat rear side. The front portions of the pair of front-rear extending portions 34A are respectively sewn to the left and right side surfaces of the airbag main body 40 that is in the inflated and deployed state. Due thereto, the front-rear chamber 34 is formed such that the left-right direction dimension thereof in the inflated and deployed state is smaller at the front side than at the rear side. As illustrated in FIG. 27, at the base fabric 42 that structures the above-described airbag main body 40, the upper base of a top surface panel 42A, which is trapezoidal and forms the top surface of the airbag main body 40, is formed to be shorter than at the base fabric 42 in the first embodiment. In this embodiment, structures other than those described above are similar to those of the first embodiment.

In this embodiment, the front-rear chamber 34 is formed such that the left-right direction dimension thereof in the inflated and deployed state is smaller at the front side than at the rear side. Therefore, it is difficult for the arms A of the passenger D, which are flung obliquely frontward and upward due to the impact of a vehicle collision, to interfere with the front-rear chamber 34. Due thereto, the airbag 32 being lifted-up toward the upper side by the above-described interference can be prevented or suppressed. Moreover, because it suffices to form the top surface panel 42A of the base fabric 42 of the airbag main body 40 in the shape of a trapezoid whose upper base is short, the front-rear chamber 34 that has the above-described shape can be manufactured easily.

Sixth Embodiment

Figure 28A:
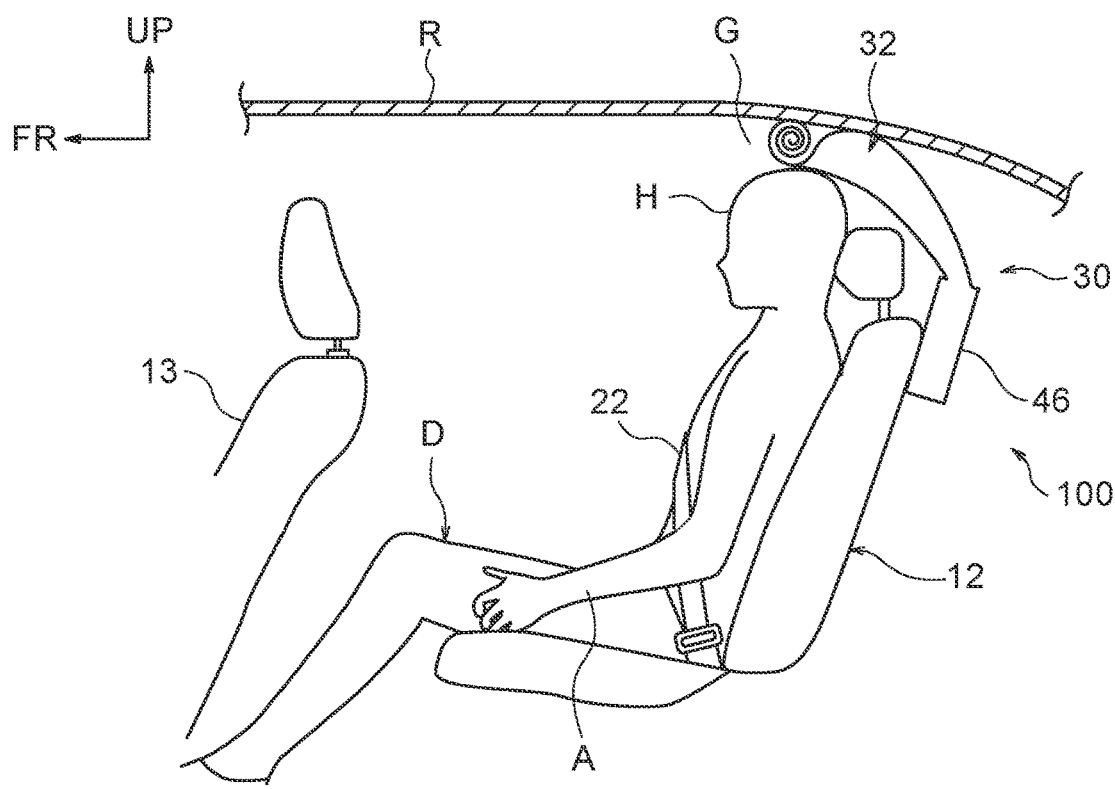
FIG. 28A is a side view illustrating a state in the midst of passage of the airbag, which is in an initial stage of inflation and deployment, through the gap between the head of the passenger and the ceiling of the vehicle, in a passenger protection device relating to a sixth embodiment.
Figure 28B:
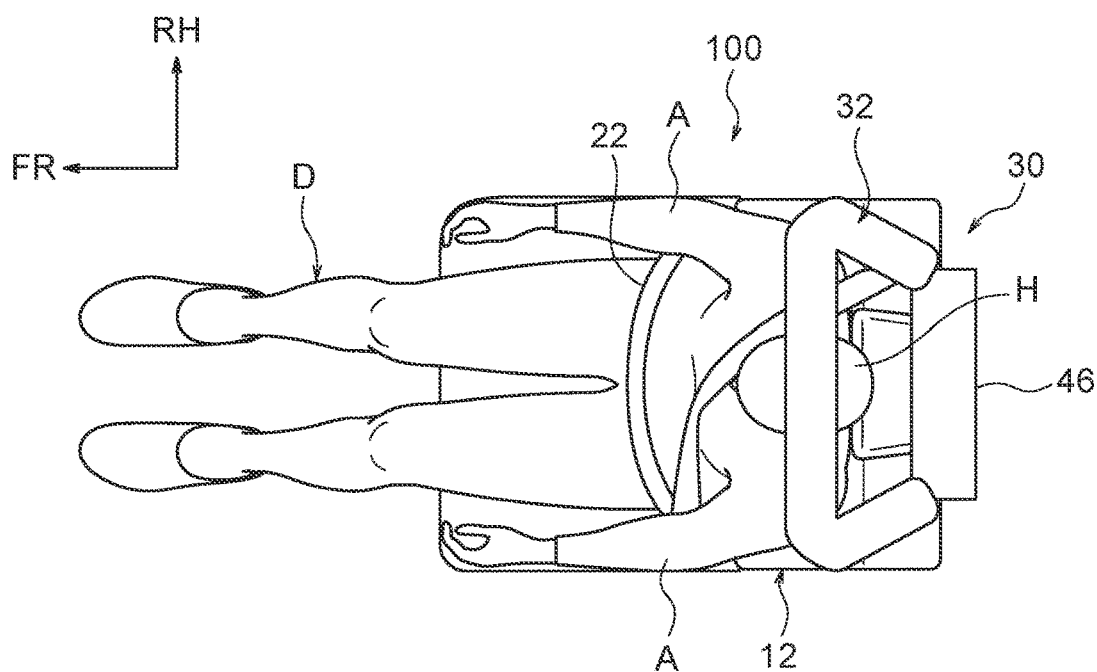
FIG. 28B is a plan view illustrating the structures shown in FIG. 28A in a state of being viewed from a seat upper side.
Figure 28C:
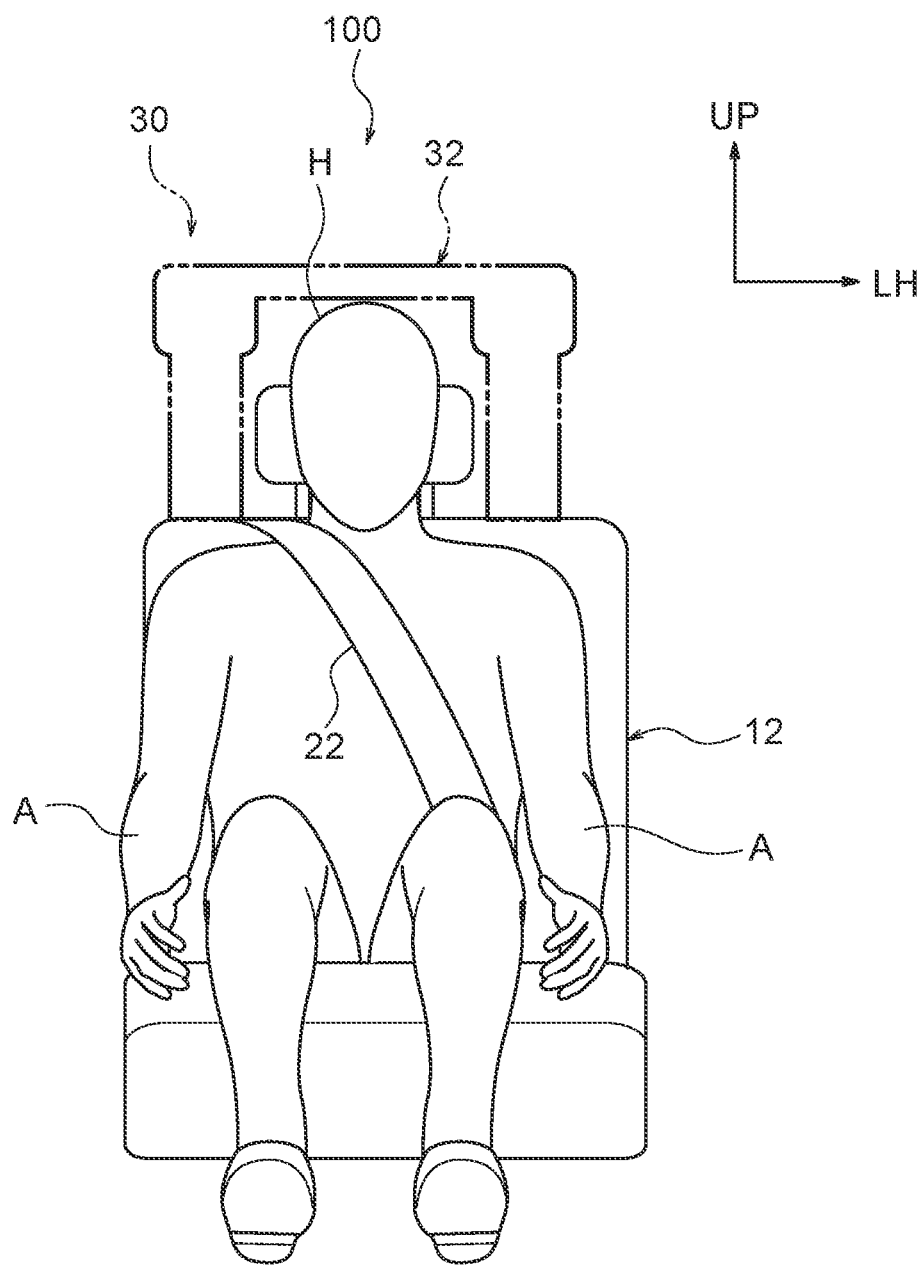
FIG. 28C is a front view illustrating the structures shown in FIG. 28A in a state of being viewed from a seat front side.

A state in the midst of passage of the airbag 32, which is in the initial stage of inflation and deployment, through the gap G between the head H of the passenger D and the ceiling R of the vehicle in a passenger protection device 100 relating to a sixth embodiment is illustrated in a side view, a plan view and a front view in FIG. 28A through FIG. 28C. A state in which the airbag 32 has finished passing through the gap G in the passenger protection device 100 relating to the sixth embodiment is illustrated in a side view, a plan view and a front view in FIG. 29A through FIG. 29C. A state in which inflation and deployment of the airbag 32 have been completed in the passenger protection device 100 relating to the sixth embodiment is illustrated in a side view, a plan view and a front view in FIG. 30A through FIG. 30C. Note that, in FIG. 28A through FIG. 30C, the airbag 32 is illustrated schematically for convenience of explanation.

Figure 29A:
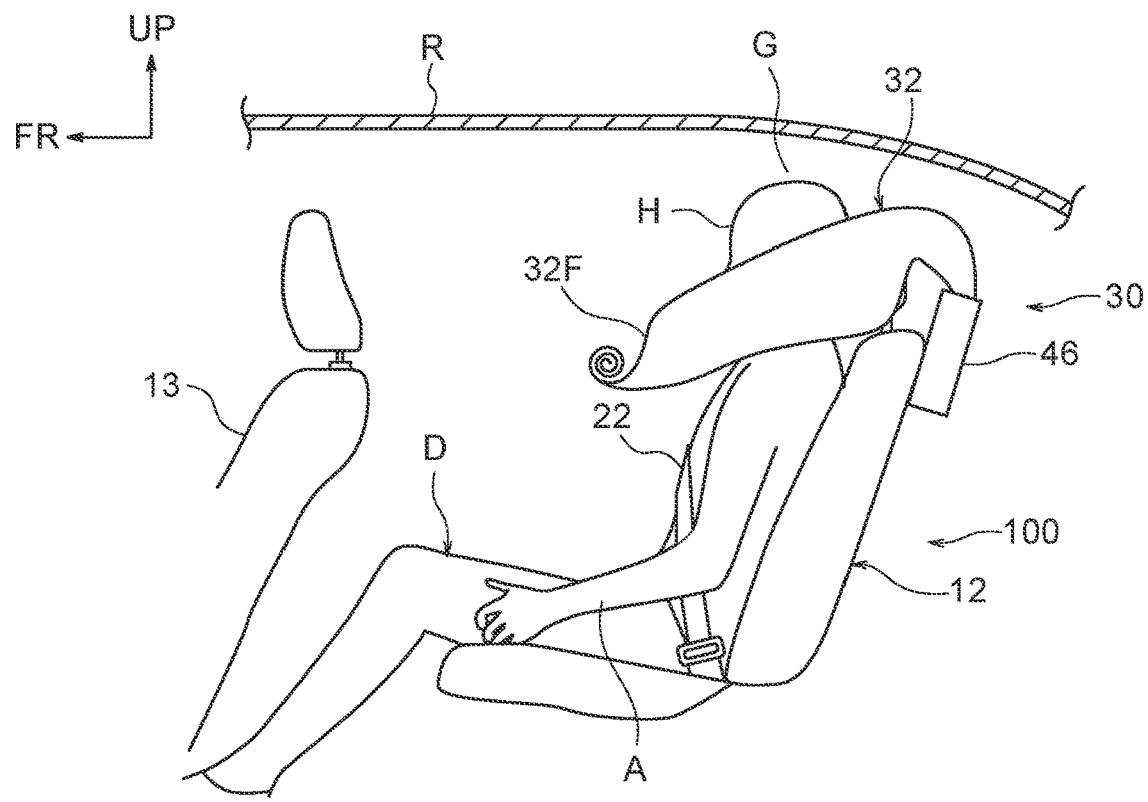
FIG. 29A is a side view illustrating a state in which the airbag has finished passing through the gap between the head of the passenger and the ceiling of the vehicle, in the passenger protection device relating to the sixth embodiment.
Figure 29B:
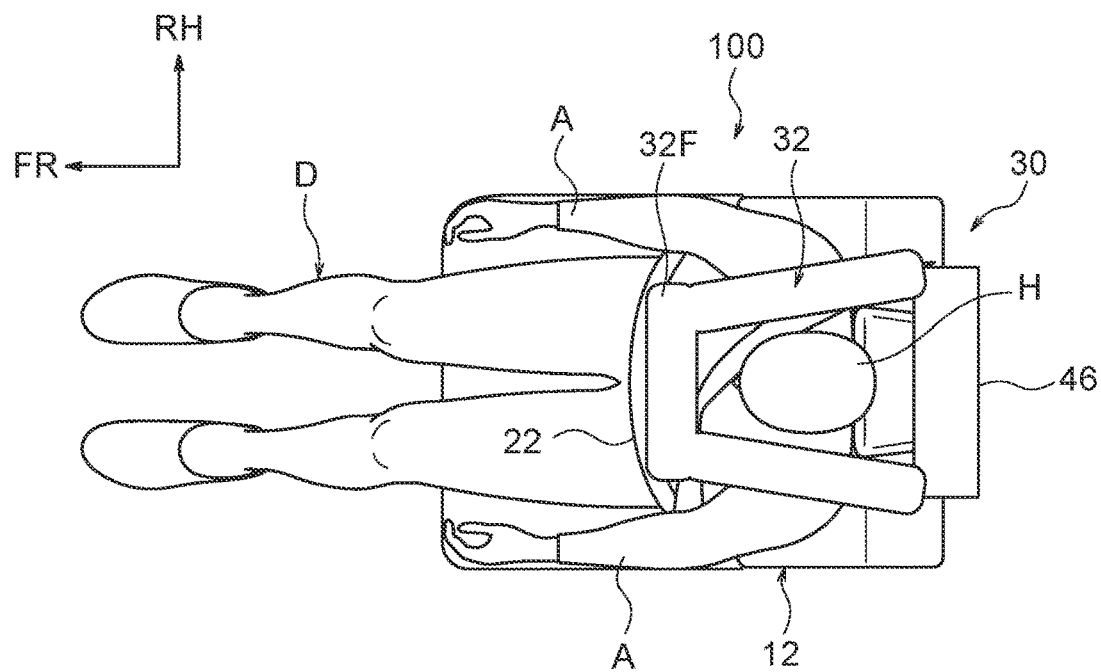
FIG. 29B is a plan view illustrating the structures shown in FIG. 29A in a state of being viewed from a seat upper side.
Figure 29C:
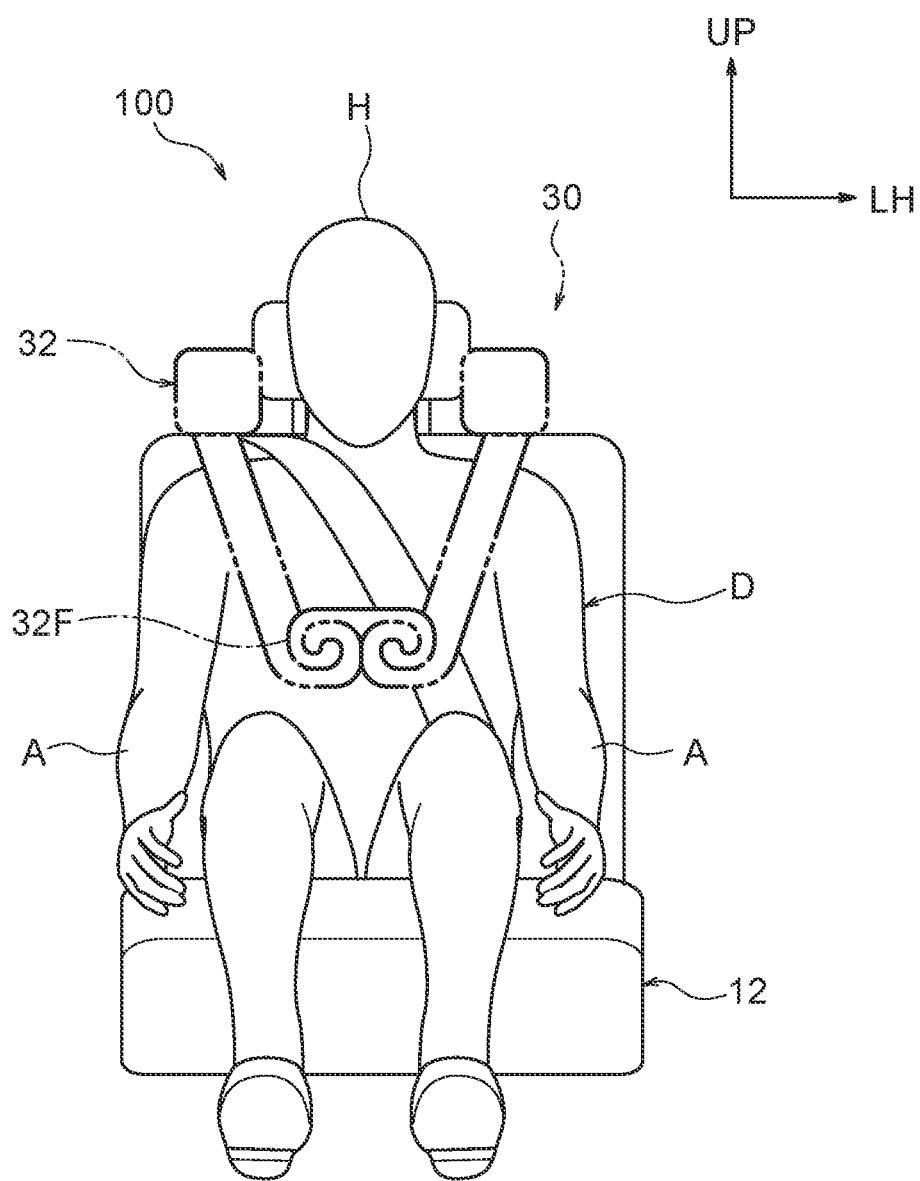
FIG. 29C is a front view illustrating the structures shown in FIG. 29A in a state of being viewed from a seat front side.
Figure 30A:
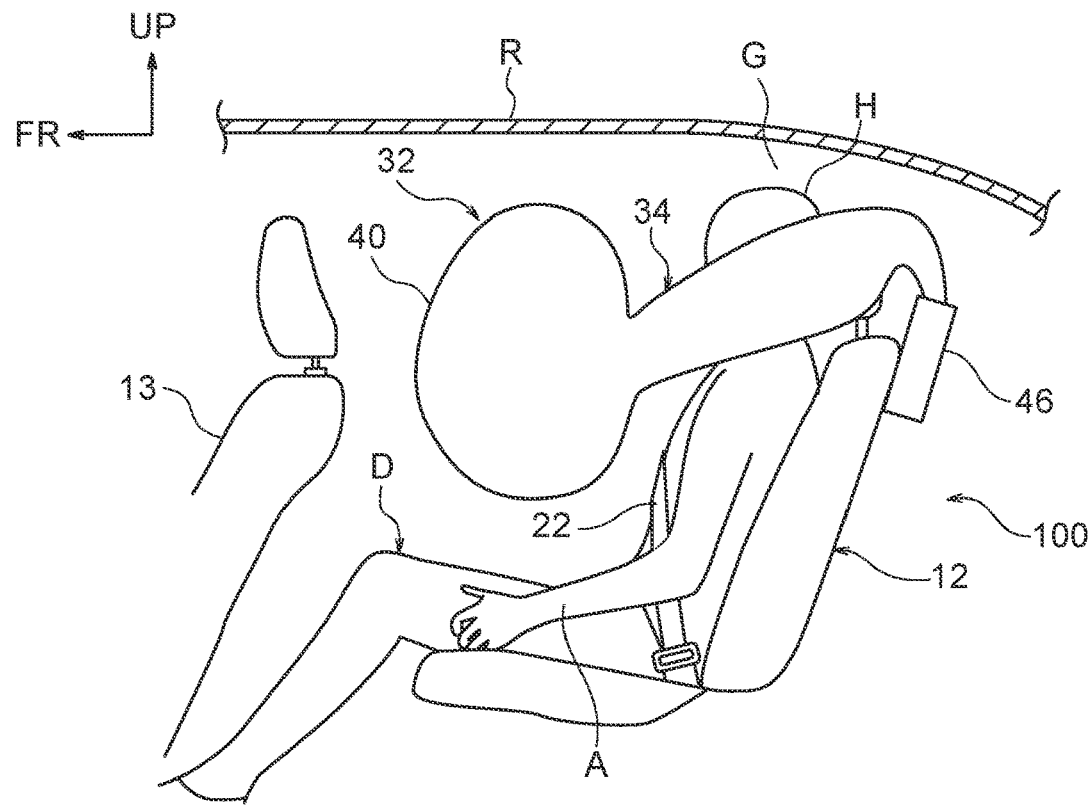
FIG. 30A is a side view illustrating a state in which inflation and deployment of the airbag have been completed in the passenger protection device relating to the sixth embodiment.
Figure 30B:
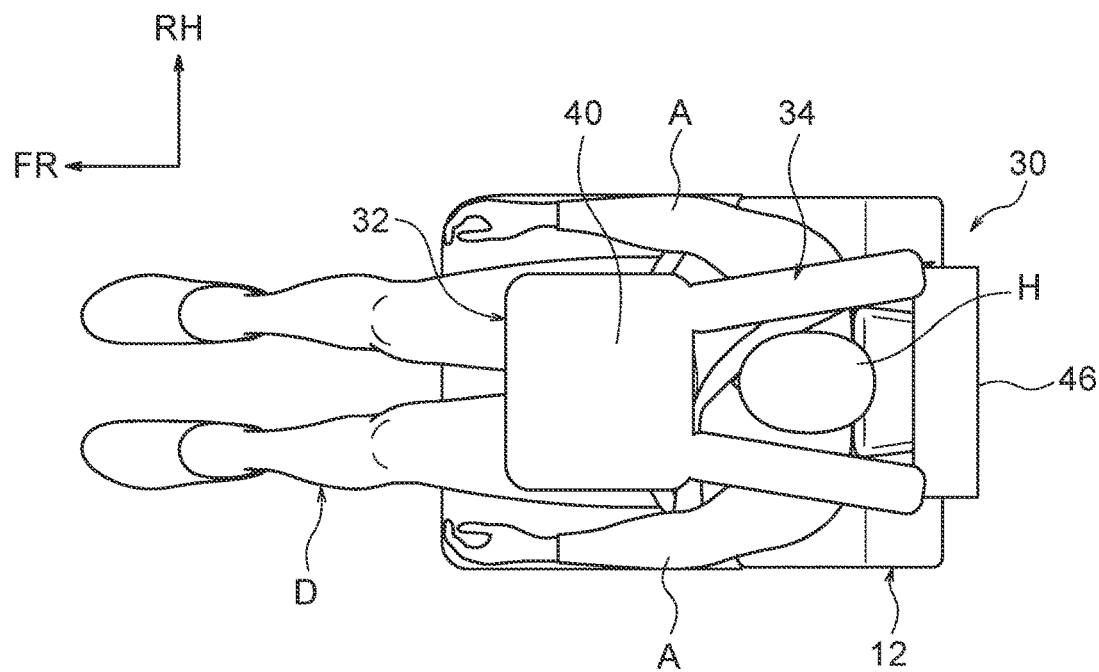
FIG. 30B is a plan view illustrating the structures shown in FIG. 30A in a state of being viewed from a seat upper side.
Figure 30C:
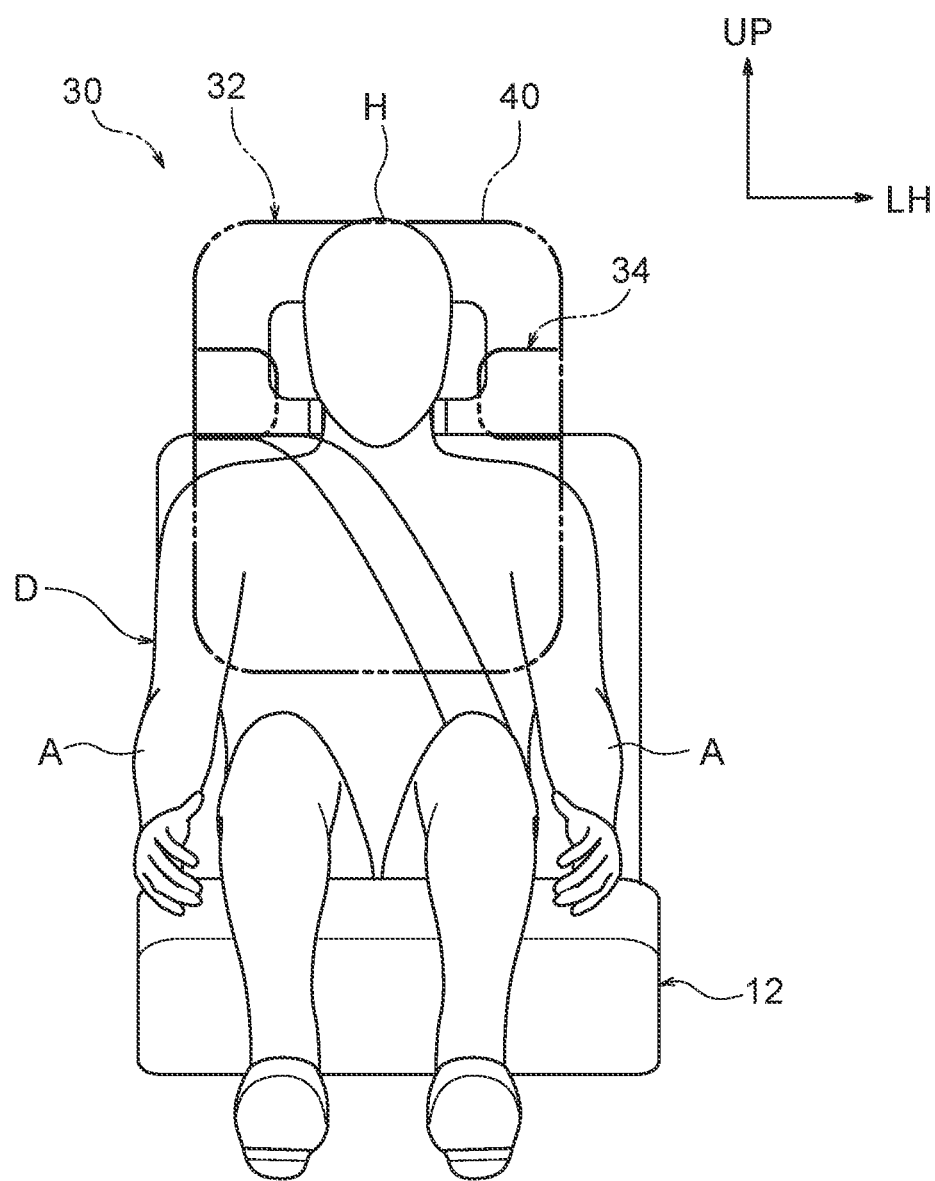
FIG. 30C is a front view illustrating the structures shown in FIG. 30A in a state of being viewed from a seat front side.

In the present embodiment, at the airbag 32 before inflation and deployment, a front side portion 32F that includes the airbag main body 40 is rolled-up from the both outer sides in the left-right direction toward the central side in the left-right direction. As illustrated in FIG. 29A through FIG. 29C, this front side portion 32F deploys toward the front side of the passenger D due to the inflation and deployment of the front-rear chamber 34, and thereafter, inflates and deploys from the left-right direction central side toward the left-right direction both outer sides. As illustrated in FIG. 29C, in the above-described rolling-up, the left side portion of the front side portion 32F is folded-up (is so-called externally rolled) so as to become a leftward-wound roll form as seen from the vehicle front side, and the right side portion of the front side portion 32F is folded-up (is so-called externally rolled) so as to become a rightward-wound roll form as seen from the vehicle front side. In this embodiment, structures other than those described above are similar to those of the first embodiment.

In this embodiment as well, effects that are similar to those of the first embodiment are obtained. Moreover, in this embodiment, the front side portion 32F of the airbag 32 deploys toward the front side of the passenger D due to the inflation and deployment of the front-rear chamber 34, and thereafter, inflates and deploys from the left-right direction central side toward the left-right direction both outer sides. Due to this inflation and deployment of the front side portion 32F, the arms A of the passenger D can be pushed aside toward the outer sides in the left-right direction. As a result, it is difficult for the arms A, which are flung obliquely forward and upward due to the impact of a vehicle collision, to interfere with the airbag 32, and therefore, the airbag 32 being lifted-up toward the upper side by this interference can be prevented or suppressed.

Although the present disclosure has been described above by exemplifying several embodiments, the present disclosure can be implemented by being modified in various ways within a scope that does not depart from the gist thereof. The scope of the right of the present disclosure is, of course, not limited by the above-described respective embodiments.

What is claimed is:

1. An airbag device, comprising:
   an inflator configured to generate gas at a time of a collision of a vehicle; and
   an airbag to which the gas is supplied, and that is configured to inflate and deploy from a seat rear side of an upper portion of a vehicle seat toward a seat front side,
   wherein the airbag has:
   a front-rear chamber having a left and right pair of front-rear extending portions that pass by respective left and right sides of a head of a passenger seated in the vehicle seat and inflate and deploy toward the seat front side, and a connecting portion connecting front end portions of the pair of front-rear extending portions in a seat left-right direction;
   an airbag main body configured to receive the gas from the connecting portion to inflate and deploy toward a side of the passenger at the seat rear side of the connecting portion, later than the front-rear chamber; and
   a restraint portion coupled to at least one of the front-rear chamber, the connecting portion, and the airbag main body and configured to engage the vehicle seat or the vehicle and apply force directed toward a seat lower side to the airbag at a time when the passenger is restrained by the airbag,
   wherein the left and right pair of front-rear extending portions are formed in elongated tube shapes that pass by the respective left and right sides of the head of the passenger seated in the vehicle seat and inflate and deploy toward the seat front side and diagonally downward.

2. The airbag device of claim 1, wherein:
   the airbag main body has:
   a chest/abdomen restraining portion restraining a chest and an abdomen of the passenger further toward a seat lower side than the front-rear chamber, and
   a head restraining portion restraining the head of the passenger further toward a seat upper side than the front-rear chamber, before restraining of the chest and the abdomen by the chest/abdomen restraining portion; and
   the restraint portion is the head restraining portion.

3. The airbag device of claim 1, wherein the restraint portion is a ceiling abutting portion provided at an upper portion of the airbag main body, and abutting a ceiling of the vehicle at a time of restraining.

4. The airbag device of claim 1, wherein the restraint portion is a left and right pair of rear tethers having respective one end portions that are attached to the pair of front-rear extending portions, and having respective other end portions that are attached to a seatback of the vehicle seat or to a vehicle body further toward the seat rear side than the passenger, and that, at the time of restraining, pull the pair of front-rear extending portions in toward obliquely rearward and downward sides of the seat.

5. The airbag device of claim 1, wherein the airbag main body is formed such that a dimension thereof in the seat left-right direction in the inflated and deployed state gradually decreases toward a lower end portion.

6. A passenger protection device, comprising:
a vehicle seat in which a passenger sits; and
the airbag device of claim 1, which is installed at the seat rear side of the upper portion of the vehicle seat.

7. The airbag device of claim 1, wherein the airbag main body being in communication with the pair of front-rear extending portions and the connecting portion.

8. The airbag device of claim 1, wherein the pair of front-rear extending portions being in communication with one another through the connecting portion.

9. An airbag device, comprising:
an inflator configured to generate gas at a time of a collision of a vehicle; and
an airbag to which the gas is supplied, and that is configured to inflate and deploy from a seat rear side of an upper portion of a vehicle seat toward a seat front side,
wherein the airbag has:
a front-rear chamber having a left and right pair of front-rear extending portions that pass by respective left and right sides of a head of a passenger seated in the vehicle seat and inflate and deploy toward the seat front side, and a connecting portion connecting front end portions of the pair of front-rear extending portions in a seat left-right direction; and
an airbag main body configured to receive the gas from the connecting portion for inflating and deploying toward a side of the passenger at the seat rear side of the connecting portion, later than the front-rear chamber,
wherein the front-rear chamber is formed such that a dimension thereof in the seat left-right direction in an inflated and deployed state is smaller at the seat front side than at the seat rear side.

10. The airbag device of claim 9, wherein:
the airbag main body is formed such that a dimension thereof in the seat left-right direction in the inflated and deployed state is smaller at the seat front side than at the seat rear side, and
front portions of the pair of front-rear extending portions are sewn respectively to left and right side surfaces of the airbag main body that is in the inflated and deployed state.

11. A passenger protection device, comprising:
a vehicle seat in which a passenger sits; and
the airbag device of claim 9, which is installed at the seat rear side of the upper portion of the vehicle seat.

12. The airbag device of claim 9, wherein the front-rear chamber is formed such that a dimension thereof in a seat left-right direction in an inflated and deployed state narrows on progression forward in the front-rear direction.

13. The airbag device of claim 9, wherein the airbag main body being in communication with the pair of front-rear extending portions and the connecting portion.

14. The airbag device of claim 9, wherein the pair of front-rear extending portions being in communication with one another through the connecting portion.

15. An airbag device, comprising:
an inflator configured to generate gas at a time of a collision of a vehicle; and
an airbag to which the gas is supplied, and that is configured to inflate and deploy from a seat rear side of an upper portion of a vehicle seat toward a seat front side,
wherein the airbag has:
a front-rear chamber having a left and right pair of front-rear extending portions that pass by respective left and right sides of a head of a passenger seated in the vehicle seat and inflate and deploy toward the seat front side, and a connecting portion connecting front end portions of the pair of front-rear extending portions in a seat left-right direction, and
an airbag main body configured to receive the gas from the connecting portion for inflating and deploying toward a side of the passenger at the seat rear side of the connecting portion, later than the front-rear chamber; and
wherein a front side portion, which includes the airbag main body, of the airbag before inflation and deployment is rolled-up from both outer sides in the seat left-right direction toward a central side in the seat left-right direction.

16. A passenger protection device, comprising:
a vehicle seat in which a passenger sits; and
the airbag device of claim 15, which is installed at the seat rear side of the upper portion of the vehicle seat.

17. The airbag device of claim 15, wherein the airbag main body being in communication with the pair of front-rear extending portions and the connecting portion.

18. The airbag device of claim 15, wherein the pair of front-rear extending portions being in communication with one another through the connecting portion.

* * * * *